US010611504B2

(12) United States Patent
Halsband et al.

(10) Patent No.: US 10,611,504 B2
(45) Date of Patent: Apr. 7, 2020

(54) DOCKING SYSTEM AND METHOD FOR SATELLITES

(71) Applicant: EFFECTIVE SPACE SOLUTIONS LTD., Tel Aviv-Jaffa (IL)

(72) Inventors: Arie Halsband, Tel Aviv (IL); Nevo Taaseh, Moshav Adderet (IL); Meidad Pariente, Hod Hasharon (IL); Michael Reitman, Natanya (IL)

(73) Assignee: EFFECTIVE SPACE SOLUTIONS LTD., Tel Aviv (IL)

( * ) Notice: Subject to any disclaimer, the term of this patent is extended or adjusted under 35 U.S.C. 154(b) by 431 days.

(21) Appl. No.: 15/506,125

(22) PCT Filed: Aug. 26, 2015

(86) PCT No.: PCT/IL2015/050856
§ 371 (c)(1),
(2) Date: Feb. 23, 2017

(87) PCT Pub. No.: WO2016/030890
PCT Pub. Date: Mar. 3, 2016

(65) Prior Publication Data
US 2018/0148197 A1   May 31, 2018

Related U.S. Application Data

(60) Provisional application No. 62/041,780, filed on Aug. 26, 2014.

(51) Int. Cl.
*B64G 1/64* (2006.01)
*B64G 1/10* (2006.01)
(Continued)

(52) U.S. Cl.
CPC ........... *B64G 1/646* (2013.01); *B64G 1/1078* (2013.01); *B64G 1/222* (2013.01); *B64G 1/242* (2013.01);
(Continued)

(58) Field of Classification Search
CPC .............................. B64G 1/646; B64G 1/1078
See application file for complete search history.

(56) References Cited

U.S. PATENT DOCUMENTS 3,910,533 A   10/1975 Cheatham et al.
3,948,470 A   4/1976 Perkins
(Continued)

FOREIGN PATENT DOCUMENTS

CN   101323377 A   12/2008
CN   103331759 A   10/2013
(Continued)

OTHER PUBLICATIONS

Office Action dated Mar. 7, 2019, issued in corresponding Russian Application No. 2017109821/11(017215) (4 pages).
(Continued)

*Primary Examiner* — Richard G Davis
(74) *Attorney, Agent, or Firm* — Finnegan, Henderson, Farabow, Garrett, & Dunner, LLP

(57) ABSTRACT

The present invention relates to a service satellite having a body, a controller and a docking unit. The docking unit includes at least two foldable, adjustable gripping arms pivotally mounted on the satellite body, each gripping arm being pivotable relative to the satellite body, and a gripping end at each free end of the gripping arms, wherein the gripping ends are adapted and configured to capture and grip a target portion of an orbiting satellite. Each gripping arm is controllable independently by the controller, which coordinates the motion of the arms. The service satellite also
(Continued)

includes a propulsion unit including a first thruster mounted adjacent a Nadir end of the service satellite body, and a balance thruster, the balance thruster being distanced from the first thruster and facing a different direction than the first thruster, propellant for the thruster and the balance thruster; and means for aligning the thrusters so that a thrusting vector passes through a joint center of gravity of the service satellite and the serviced satellite.

14 Claims, 15 Drawing Sheets

(51) Int. Cl.
   *B64G 1/22* (2006.01)
   *B64G 1/24* (2006.01)
   *B64G 1/26* (2006.01)
   *B64G 4/00* (2006.01)
   B64G 1/40 (2006.01)
   B64G 1/44 (2006.01)
   B64G 1/66 (2006.01)

(52) U.S. Cl.
   CPC .............. *B64G 1/26* (2013.01); *B64G 4/00* (2013.01); *B64G 1/405* (2013.01); *B64G 1/44* (2013.01); *B64G 1/641* (2013.01); *B64G 1/66* (2013.01); *B64G 2004/005* (2013.01)

(56) References Cited

U.S. PATENT DOCUMENTS

| | | |
|---|---|---|
| 4,018,409 A | 4/1977 | Burch et al. |
| 4,173,324 A | 11/1979 | Rudmann |
| 4,177,964 A | 12/1979 | Hujsak et al. |
| 4,195,804 A | 4/1980 | Hujsak et al. |
| 4,219,171 A | 8/1980 | Rudmann |
| 4,260,187 A | 4/1981 | Bejczy |
| 4,295,740 A | 10/1981 | Sturges, Jr. |
| 4,298,178 A | 11/1981 | Hujsak |
| 4,381,092 A | 4/1983 | Barker |
| 4,407,469 A | 10/1983 | Fox |
| 4,500,057 A | 2/1985 | Duwelz |
| 4,588,150 A | 5/1986 | Bock et al. |
| 4,607,815 A | 8/1986 | Turci et al. |
| 4,635,885 A | 1/1987 | Hujsak |
| 4,718,709 A | 1/1988 | Myers et al. |
| 4,834,531 A | 5/1989 | Ward |
| 4,881,809 A | 11/1989 | Thierry |
| 4,890,918 A | 1/1990 | Monford |
| 5,046,691 A | 9/1991 | Hart |
| 5,109,345 A | 4/1992 | Dabney et al. |
| 5,120,243 A | 6/1992 | Mee |
| 5,253,944 A | 10/1993 | Preston |
| 5,294,079 A | 3/1994 | Draznin et al. |
| 5,299,764 A | 4/1994 | Scott |
| 5,302,816 A | 4/1994 | Tulet |
| 5,334,848 A | 8/1994 | Grimm |
| 5,340,060 A | 8/1994 | Shindo |
| 5,349,532 A | 9/1994 | Tilley et al. |
| 5,364,046 A | 11/1994 | Dobbs et al. |
| 5,411,227 A | 5/1995 | Basuthakur et al. |
| 5,436,841 A | 7/1995 | Ferro |
| 5,443,231 A | 8/1995 | Anzel |
| 5,466,025 A | 11/1995 | Mee |
| 5,490,075 A | 2/1996 | Howard et al. |
| 5,511,748 A | 4/1996 | Scott |
| 5,617,335 A | 4/1997 | Hashima et al. |
| 5,734,736 A | 3/1998 | Palmer et al. |
| 5,735,488 A | 4/1998 | Schneider |
| 5,765,780 A | 6/1998 | Barskey et al. |
| 5,803,407 A | 9/1998 | Scott |
| 5,806,802 A | 9/1998 | Scott |
| 5,895,014 A * | 4/1999 | Sullivan .................. B64G 1/24 244/168 |
| 6,017,000 A | 1/2000 | Scott |
| 6,032,904 A | 3/2000 | Hosick et al. |
| 6,053,455 A | 4/2000 | Price et al. |
| 6,070,833 A * | 6/2000 | Burke ...................... B64G 1/24 244/168 |
| 6,091,345 A | 7/2000 | Howard et al. |
| 6,102,337 A | 8/2000 | Quartararo |
| 6,227,495 B1 | 5/2001 | Howard et al. |
| 6,254,035 B1 | 7/2001 | Howard et al. |
| 6,260,805 B1 | 7/2001 | Yocum, Jr. et al. |
| 6,296,207 B1 | 10/2001 | Tilley et al. |
| 6,299,107 B1 | 10/2001 | Kong et al. |
| 6,330,987 B1 | 12/2001 | Scott |
| 6,354,540 B1 | 3/2002 | Lewis et al. |
| 6,360,995 B1 | 3/2002 | Nygren, Jr. |
| 6,445,981 B1 | 9/2002 | Higham et al. |
| 6,481,672 B1 | 11/2002 | Goodzeit et al. |
| 6,484,973 B1 | 11/2002 | Scott |
| 6,523,784 B2 | 2/2003 | Steinsiek et al. |
| 6,595,469 B2 | 7/2003 | Li et al. |
| 6,634,603 B2 | 10/2003 | Cooper |
| 6,637,701 B1 | 10/2003 | Glogowski et al. |
| 6,658,329 B1 | 12/2003 | Howard et al. |
| 6,669,148 B2 | 12/2003 | Anderman et al. |
| 6,677,941 B2 | 1/2004 | Lin |
| 6,742,745 B2 | 6/2004 | Tchoryk et al. |
| 6,840,481 B1 * | 1/2005 | Gurevich ............... B64G 1/646 244/172.4 |
| 6,843,446 B2 | 1/2005 | Scott |
| 6,845,303 B1 | 1/2005 | Byler |
| 6,866,232 B1 | 3/2005 | Finney |
| 6,896,441 B1 | 5/2005 | Champagne et al. |
| 6,910,660 B2 | 6/2005 | LeCroy, Jr. |
| 6,945,500 B2 | 9/2005 | Wingo |
| 6,969,030 B1 * | 11/2005 | Jones ..................... B64G 1/646 244/115 |
| 7,070,151 B2 | 7/2006 | D'Ausilio et al. |
| 7,104,505 B2 | 9/2006 | Tchoryk et al. |
| 7,114,682 B1 | 10/2006 | Kistler et al. |
| 7,133,815 B2 | 11/2006 | Zentgraf |
| 7,142,981 B2 | 11/2006 | Hablani |
| 7,195,206 B2 | 3/2007 | Kerstein |
| 7,207,525 B2 * | 4/2007 | Bischof .................... B25J 15/10 244/158.2 |
| 7,216,833 B2 | 5/2007 | D'Ausilio et al. |
| 7,216,834 B2 | 5/2007 | D'Ausilio et al. |
| 7,240,879 B1 | 7/2007 | Cepollina et al. |
| 7,293,743 B2 | 11/2007 | Cepollina et al. |
| 7,365,832 B2 | 4/2008 | Kase |
| 7,370,834 B2 | 5/2008 | Scott |
| 7,387,279 B2 | 6/2008 | Anderman et al. |
| 7,438,264 B2 | 10/2008 | Cepollina et al. |
| 7,461,818 B2 | 12/2008 | D'Ausilio et al. |
| 7,484,690 B2 | 2/2009 | D'Ausilio et al. |
| 7,513,459 B2 | 4/2009 | Cepollina et al. |
| 7,513,460 B2 | 4/2009 | Cepollina et al. |
| 7,515,257 B1 | 4/2009 | Roe et al. |
| 7,535,706 B2 | 5/2009 | Herberholt et al. |
| 7,575,199 B2 | 8/2009 | D'Ausilio et al. |
| 7,575,200 B2 | 8/2009 | Behrens et al. |
| 7,588,213 B2 | 9/2009 | D'Ausilio et al. |
| 7,607,616 B2 | 10/2009 | Lundgren |
| 7,611,096 B2 | 11/2009 | D'Ausilio et al. |
| 7,611,097 B2 | 11/2009 | D'Ausilio et al. |
| 7,624,950 B2 | 12/2009 | D'Ausilio et al. |
| 7,669,804 B2 | 3/2010 | Strack et al. |
| 7,823,837 B2 | 11/2010 | Behrens et al. |
| 7,828,249 B2 | 11/2010 | Ritter et al. |
| 7,850,388 B2 | 12/2010 | Khoshnevis |
| 7,857,261 B2 | 12/2010 | Tchoryk, Jr. et al. |
| 7,861,974 B2 | 1/2011 | Hays et al. |
| 7,861,975 B2 | 1/2011 | Behrens et al. |
| 7,961,301 B2 | 6/2011 | Earhart et al. |
| 7,992,824 B2 | 8/2011 | Tchoryk, Jr. et al. |
| 8,006,937 B1 | 8/2011 | Romano et al. |
| 8,006,938 B2 | 8/2011 | Behrens et al. |
| 8,016,242 B2 | 9/2011 | Baumann |
| 8,019,493 B1 | 9/2011 | Weigl et al. |
| 8,033,508 B2 | 10/2011 | Baumann et al. |

(56) References Cited

U.S. PATENT DOCUMENTS

| | | | |
|---|---|---|---|
| 8,056,864 B2 | 11/2011 | Hays et al. | |
| 8,074,935 B2 | 12/2011 | Gryniewski et al. | |
| 8,091,835 B2 | 1/2012 | Behrens et al. | |
| 8,132,761 B2 | 3/2012 | Gruber et al. | |
| 8,181,911 B1 | 5/2012 | Gryniewski et al. | |
| 8,196,870 B2 | 6/2012 | Gryniewski et al. | |
| 8,205,838 B2 | 6/2012 | Moorer, Jr. et al. | |
| 8,210,480 B2 | 7/2012 | Moorer et al. | |
| 8,240,613 B2 | 8/2012 | Ritter et al. | |
| 8,245,370 B2 | 8/2012 | Ritter et al. | |
| 8,282,043 B2 | 10/2012 | Ho | |
| 8,306,273 B1 | 11/2012 | Gryniewski et al. | |
| 8,326,523 B2 | 12/2012 | Stimac et al. | |
| 8,333,347 B2 | 12/2012 | Ritter et al. | |
| 8,352,100 B2 | 1/2013 | Stimac et al. | |
| 8,386,096 B2 | 2/2013 | Stimac et al. | |
| 8,412,391 B2 | 4/2013 | Paluszek et al. | |
| 8,439,312 B2 | 5/2013 | Ho et al. | |
| 8,448,904 B2 | 5/2013 | Gryniewski et al. | |
| 8,464,983 B2 | 6/2013 | Knirsch | |
| 8,820,353 B2 | 9/2014 | Yandle et al. | |
| 8,899,527 B2 | 12/2014 | Allen et al. | |
| 8,976,340 B2 | 3/2015 | Gilliland et al. | |
| 9,001,313 B2 | 4/2015 | Kameyama et al. | |
| 9,041,915 B2 | 5/2015 | Earhart et al. | |
| 9,108,747 B2 | 8/2015 | Roberts et al. | |
| 9,231,323 B1 | 1/2016 | Jaeger | |
| 9,260,206 B2 | 2/2016 | Allen et al. | |
| 9,284,069 B2 | 3/2016 | Bigelow | |
| 9,284,072 B2 | 3/2016 | Horie | |
| 9,284,073 B2 | 3/2016 | Bigelow | |
| 9,302,793 B2 | 4/2016 | Ghofranian et al. | |
| 9,399,295 B2 | 7/2016 | Roberts et al. | |
| 9,522,746 B1 | 12/2016 | Ih et al. | |
| 9,669,950 B2 * | 6/2017 | Rembala | B64G 1/646 |
| 2002/0179775 A1 | 12/2002 | Turner | |
| 2003/0029969 A1 | 2/2003 | Turner | |
| 2003/0183726 A1 | 10/2003 | Lounge et al. | |
| 2004/0031885 A1 | 2/2004 | D'Ausilio et al. | |
| 2004/0164205 A1 | 8/2004 | Kellberg | |
| 2004/0245405 A1 | 12/2004 | Tchoryk et al. | |
| 2005/0263649 A1 | 12/2005 | Ritter et al. | |
| 2006/0145024 A1 | 7/2006 | Kosmas | |
| 2007/0129879 A1 | 6/2007 | Fedora | |
| 2007/0228220 A1 * | 10/2007 | Behrens | B64G 1/1078 244/172.5 |
| 2008/0011903 A1 | 1/2008 | D'Ausilio et al. | |
| 2008/0029651 A1 | 2/2008 | D'Ausilio et al. | |
| 2008/0078886 A1 | 4/2008 | Foster et al. | |
| 2009/0164055 A1 | 6/2009 | Kosmas | |
| 2009/0166476 A1 | 7/2009 | Termini | |
| 2010/0038491 A1 | 2/2010 | Cepollina et al. | |
| 2011/0180670 A1 | 7/2011 | D'Ausilio et al. | |
| 2012/0097797 A1 | 4/2012 | Woo et al. | |
| 2012/0325974 A1 * | 12/2012 | Baudasse | B64G 1/222 244/172.6 |
| 2013/0126678 A1 | 5/2013 | Romney, Jr. | |
| 2013/0249229 A1 | 9/2013 | Roberts et al. | |
| 2014/0107865 A1 | 4/2014 | Griffith, Sr. et al. | |
| 2014/0158830 A1 | 6/2014 | Rossettini et al. | |
| 2014/0188277 A1 | 7/2014 | Lee et al. | |
| 2014/0361123 A1 | 12/2014 | Celerier | |
| 2015/0001345 A1 | 1/2015 | Polle | |
| 2015/0008290 A1 | 1/2015 | Bigelow | |
| 2015/0053823 A1 * | 2/2015 | Bigelow | B64G 1/646 244/172.4 |
| 2015/0115107 A1 | 4/2015 | Andoh | |
| 2015/0307214 A1 | 10/2015 | Amalric | |
| 2015/0314893 A1 | 11/2015 | Rembala et al. | |
| 2015/0346344 A1 | 12/2015 | Gilliland et al. | |
| 2016/0039543 A1 | 2/2016 | Roberts et al. | |
| 2016/0039544 A1 | 2/2016 | Roberts et al. | |
| 2016/0046395 A1 | 2/2016 | Mansour et al. | |
| 2016/0114908 A1 | 4/2016 | Knirsch et al. | |
| 2016/0130020 A1 * | 5/2016 | Chambert | B64G 1/1078 244/172.4 |
| 2016/0194095 A1 | 7/2016 | Weiss et al. | |
| 2016/0207640 A1 | 7/2016 | Kaltenbach | |
| 2016/0332308 A1 * | 11/2016 | Roberts | B25J 15/0226 |
| 2017/0081048 A1 | 3/2017 | Glogowski et al. | |
| 2017/0225805 A1 | 8/2017 | Wang et al. | |
| 2017/0283094 A1 | 10/2017 | Ho | |

FOREIGN PATENT DOCUMENTS

| | | |
|---|---|---|
| DE | 3244211 A1 | 5/1984 |
| DE | 19846327 C1 | 3/2000 |
| EP | 0369065 | 5/1990 |
| EP | 0741655 B2 | 5/2010 |
| EP | 2530018 | 12/2012 |
| EP | 2660154 A2 | 11/2013 |
| JP | 1-282098 | 11/1989 |
| JP | H03-118299 | 5/1991 |
| JP | H04-138999 A | 5/1992 |
| JP | H09-511472 A | 11/1997 |
| JP | H11-291998 A | 10/1999 |
| JP | 2004-330943 A | 11/2004 |
| RU | 2026243 C1 | 1/1995 |
| WO | WO 96/15030 | 5/1996 |
| WO | WO 97/31822 | 9/1997 |
| WO | WO 2005/073085 | 8/2005 |
| WO | WO 2005/110847 | 11/2005 |
| WO | WO 2005/118394 | 12/2005 |
| WO | WO 2008/066512 | 6/2008 |
| WO | WO 2011/110701 | 9/2011 |
| WO | WO 2014/006478 | 1/2014 |
| WO | WO 2014/024199 | 2/2014 |
| WO | WO 2015/158932 | 10/2015 |
| WO | WO 2015158932 | 10/2015 |
| WO | WO 2016/020390 | 2/2016 |

OTHER PUBLICATIONS

Search Report dated Mar. 1, 2019, issued in corresponding Russian Application No. 2017109821/11(017215) (2 pages).

European Search Report dated Apr. 18, 2018, in Application No. 15835340.9—1010 / 3186151—PCT/IL2015050856 (10 pages).

Hirzinger, Gerd, "West Germany's First Space Robot," Aerospace America, American Institute of Aeronautics & Astronautics, New York, vol. 27, No. 8, Aug. 1, 1989 (pp. 42-46).

Machida, Kazuo et al., "Maneuvering and Manipulation of Flying Space Telerobotics System," Proceedings of the 1992 IEEE/RSJ International Conference on Intelligent Robots and Systems, Raleigh, NC (Jul. 7-10, 1992) (pp. 3-10).

Mugnuolo, R., et al., "The Spider manipulation system (SMS); The Italian approach to space automation," Robotics and Autonomous Systems (Mar. 1, 1998) (pp. 79-88).

Office Action dated Jun. 8, 2017, in U.S. Appl. No. 15/450,501, filed Mar. 6, 2017.

Office Action dated Nov. 14, 2017, in U.S. Appl. No. 15/450,501, filed Mar. 6, 2017.

Yoshida, Kazuya et al., "Dual Arm Coordination in Space Free-Flying Robot," Proceedings of the 1991 IEEE, International Conference on Robotics and Automation, Sacramento, California, Apr. 9-11, 1991 (pp. 2516-2520).

First Office Action issued by the Chinese Intellectual Property Office in Chinese Patent Application No. 2015800574403, dated Jan. 4, 2019 (12 pages).

English-language International Search Report from the Israel Patent Office for International Application No. PCT/IL2015/050856, dated Dec. 14, 2015.

Written Opinion of the International Searching Authority from the Israel Patent Office for International Application No. PCT/IL2015/050856, dated Dec. 14, 2015.

Bergmann et al., "Mass Property Estimation for Control of Asymmetrical Satellites," J. Guidance, vol. 10, No. 5, Sep.-Oct. 1987 (pp. 483-491).

Collins et al., "Small Orbit Transfer Vehicle (OTV) for On-Orbit Satellite Servicing and Resupply," 15th Annual/USU Conference on Small Satellites, Aug. 2001 (pp. 1-17).

(56) References Cited

OTHER PUBLICATIONS

Dabney, "Automatic Rendezvous and Docking: A Parametric Study," NASA Technical Paper 2314, May 1984 (35 pages).
Fehse, "Autonomous Rendezvous and Docking of Spacecraft," Chapter 1, Cambridge University Press, 2003, pp. 1-7 (15 pages total).
Inaba et al., "Rescuing a Stranded Satellite in Space—Experimental Robotic Capture of Non-Cooperative Satellites," Trans. Japan Soc. Aero. Space Sci., vol. 48, No. 162, pp. 213-220, 2006.
Maediger et al., "Robotics Servicing Tool for Large Satellites," Airbus Defence and Space, Bremen, Germany, 2014, available at http://robotics.estec.esa.int/i~SAIRAS/isairas2014/Data/Session%205b/ISAIRAS_FinalPaper_0028.pdf (8 pages).
Masek et al., "Technical Memorandum 33-510," National Aeronautics and Space Administration, Nov. 15, 1971 (28 pages).
Meissinger et al., "Mission Design and System Requirements for a Multiple-Function Orbital Transfer Vehicle," American Institute of Aeronautics and Astronautics, Sep. 1999 (11 pages).
LeRoy et al, "Spacecraft Attitude Control for a Solar Electric Geosynchronous Transfer Mission," NASA Technical Memorandum, Mar. 19, 1975 (15 pages).
Wertz et al., "Autonomous Rendezvous and Docking Technologies—Status and Prospects," SPIE AeroSense Symposium, Paper No. 5088-3, Apr. 21, 2003 (11 pages).
European Search Report dated Jul. 26, 2018 in European Application No. 18160022.2 (9 pages).
Office Action dated Jul. 30, 2019, issued in corresponding Japanese Application No. 2017-530453 (7 pages).

\* cited by examiner

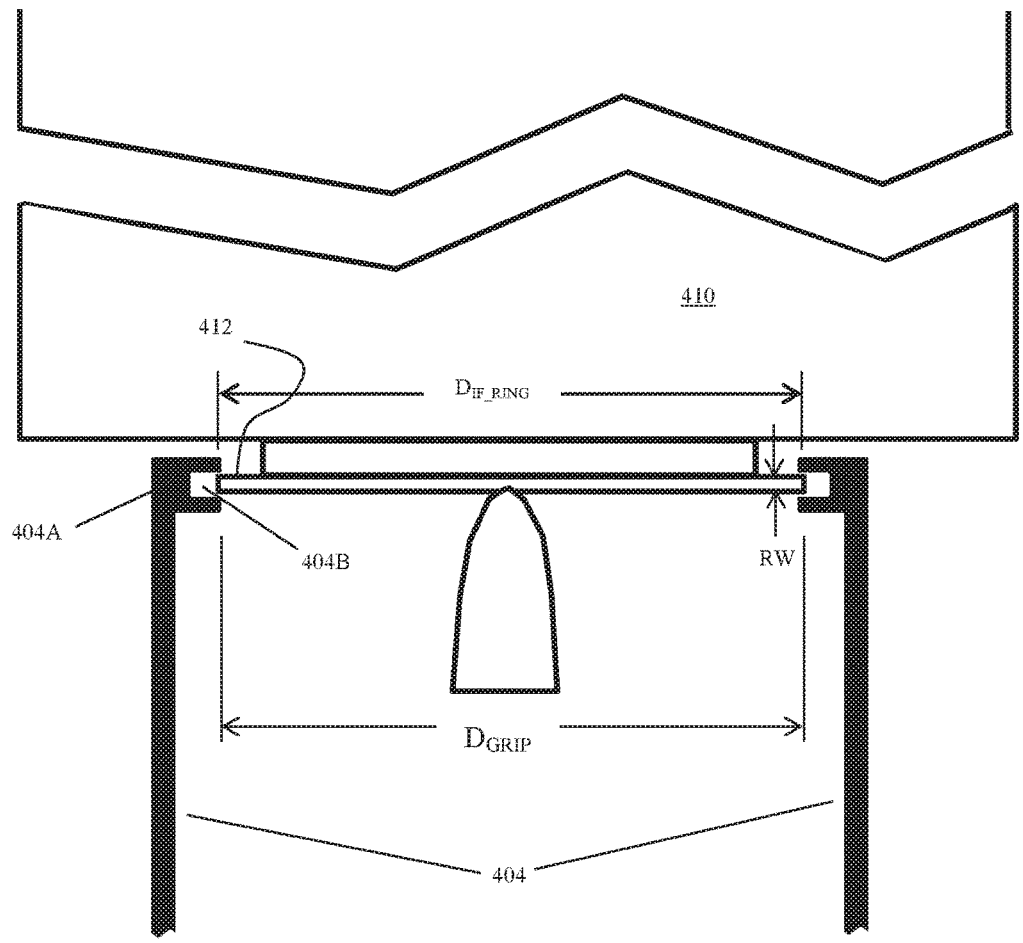
Fig. 4A
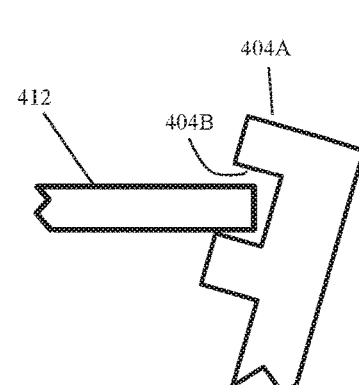 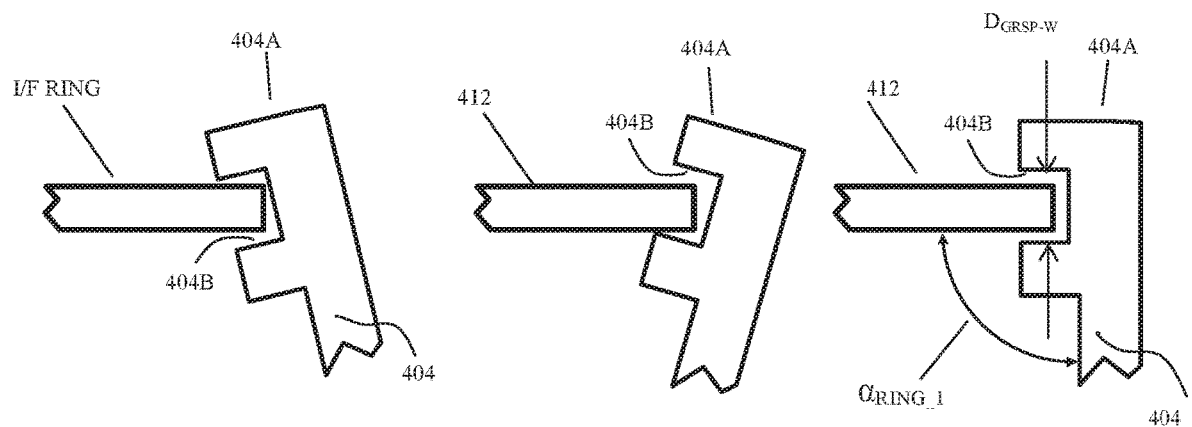 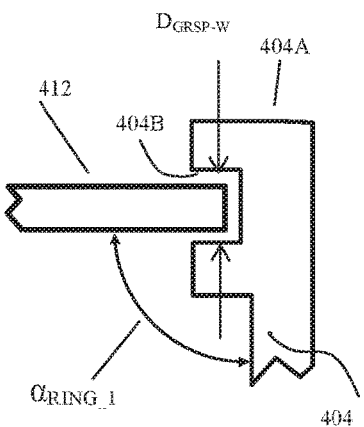
Fig. 4B  Fig. 4C  Fig. 4D

DOCKING SYSTEM AND METHOD FOR SATELLITES

RELATED APPLICATIONS

This application is a U.S. National Phase entry under 35 U.S.C. § 371 from PCT International Application No. PCT/IL2015/050856, filed Aug. 26, 2015, which claims the benefit of priority of U.S. Provisional Patent Application No. 62/041,780 filed on Aug. 26, 2014, all of which are incorporated herein by reference.

FIELD OF THE INVENTION

The present invention relates to satellites, in general, and, in particular, to service satellites for servicing satellites in orbit.

BACKGROUND OF THE INVENTION

Commercial telecommunications satellites generate approximately 75% of the entire geostationary earth orbit (GEO) space sector revenue. Their operational life spans between 12 and 15 years, and these limits are largely imposed by the amount of fuel available for station keeping. All on-board systems might be capable of functioning properly for a long time, but without propellant, the satellite cannot maintain its operational orbit—it drifts from its operational orbit and therefore cannot support the communication mission requirements. A non-operational satellite that remains in space is considered space debris. To mitigate the problem of accumulating space debris, a UN policy requires that "at the end of operational life, geostationary spacecraft should be placed in a disposal orbit that has a perigee at least 300 km above the geostationary orbit". The Federal Communications Commission (FCC) passed a similar regulation in 2004. To comply with these regulations, when relatively little propellant remains, satellites use their residual station-keeping propellant to deorbit and often sacrifice several months of their design lifetime, which corresponds to a significant loss of economic value.

If on-orbit station keeping and tugging services were available, GEO satellites could be left in operational orbits until their propellant supplies were completely exhausted and then transferred to a disposal orbit by a tug. This alternative would bring additional revenue to the satellite operators due to the extended use of on-board transponders. Moreover, GEO satellites could be left in operational orbits even after their propellant supplies are completely exhausted, by providing station keeping services by the space tug service satellite, as will be explained later.

A tugging service, or life extension mission, might be complicated. Several concepts were discussed in the past. Some of these suggestions involved using large satellites and, eventually, more expensive solutions which were likely to be over the threshold of commercial viability. Others propose refueling services, which may be difficult to accomplish when the served satellite wasn't pre-designed for such service. Another complexity is that the current in-space satellites were not designed for service, and have different shapes and mechanical/electrical/propellant interfaces.

Accordingly, there is a need for a solution that will enable a variety of satellites which are approaching the last period of propellant service to utilize and completely exhaust their propellant means for the satellite's original mission, leaving the mission of tugging the exhausted satellite to disposal orbit to an external service. Such external service should be able to serve a variety of different satellites, designed and launched over many years, and should be commercially viable. Preferably, such external service should also be able to provide station-keeping services and other services such as relocation of satellite in a new orbital slot, reutilizing of already inclined satellites and orbit correction of misplaced satellites, to further maintain the useful life of a satellite lacking propellant but still having functioning mission systems.

SUMMARY OF THE INVENTION

The present invention relates to a service satellite having a body, a controller and a docking unit. The docking unit includes at least two foldable, adjustable gripping arms pivotally mounted on the satellite body, each gripping arm being pivotable relative to the satellite body, and a gripping end at each free end of the gripping arms, wherein the gripping ends are adapted and configured to capture and grip a target portion of an orbiting satellite. Each gripping arm is controllable independently by the controller, which coordinates the motion of the arms.

There is also provided, according to the invention, a service satellite having a body, a controller and a propulsion unit, the propulsion unit including a main propulsion system including a first thruster mounted adjacent a Nadir end of the service satellite body; and a balance thruster mounted on a balance thruster arm. The balance thruster is distanced from the first thruster and facing a different direction than the first thruster. The satellite further includes propellant for the thruster and the balance thruster and means for aligning the thrusters so that a thrusting vector passes through a joint center of gravity of the service satellite and the serviced satellite.

There is further provided, according to the invention, a service satellite for servicing a serviced satellite, the service satellite including a stowable and deployable propulsion unit, a stowable and deployable docking unit, stowable and deployable solar panels, a communication antenna on a stowable and deployable boom, a satellite body for mounting the propulsion unit, the docking unit, the solar panels and the communication boom thereon, and a control unit in the body, wherein a volume and mass of the satellite with stowed propulsion unit, stowed docking unit, stowed solar panels and stowed communication boom conforms to criteria of a commercial auxiliary payload volume and mass definition.

There is also provided, according to the invention, a method of docking a service satellite to a serviced satellite, the method including moving the service satellite to a rendezvous distance from the satellite to be serviced, deploying at least two gripping arms, each gripping arm having a gripping end, to a distance between the arms that is larger than a size of a target portion of the serviced satellite, actuating a propulsion unit to cause the service satellite to approach the serviced satellite, and closing the gripping arms until gripping ends capture the target portion of the serviced satellite and grip the target portion.

There is further provided, according to the invention, a method of propelling a serviced satellite in an orbit in a longitude slot defining three perpendicular planes, N/S, E/W, Ze/Na, the method including docking a service satellite having a controller to the serviced satellite, actuating a first thruster to fire in a first direction for a selected period of time, actuating a balance thruster, mounted at a distance from the first thruster, to fire in a second direction for a selected period of time to provide station keeping in a plane selected from N/S or E/W, and adjusting alignment of the thrusters so that a thrusting vector passes through a joint center of gravity of the service satellite and the serviced satellite.

According to embodiments of the invention, the method further includes rotating the service satellite relative to the serviced satellite through a pre-selected yaw angle before the step of docking.

There is also provided, according to the invention, a method of re-orbiting a serviced satellite, the method including changing a thrusting direction of the docked service satellite and serviced satellite, firing a thruster to create a thrusting vector to propel the docked service satellite and serviced satellite in the changed direction of flight, adjusting alignment of the thrusters so that a thrusting vector passes through a joint center of gravity of the service satellite and the serviced satellite, when the docked service satellite and serviced satellite reach a desired orbital slot, and un-docking the service satellite from the serviced satellite to provide re-orbiting of the serviced satellite.

There is further provided, according to the invention, a method of de-orbiting a serviced satellite, the method including changing a thrusting direction of the docked service satellite and serviced satellite, firing a thruster to create a thrusting vector to propel the docked service satellite and serviced satellite in the changed direction, adjusting alignment of the thrusters so that a thrusting vector passes through a joint center of gravity of the service satellite and the serviced satellite, when the docked service satellite and serviced satellite reach a desired longitude, firing the thrusters of the service satellite to slow down the docked satellites, and when reaching a fall trajectory, un-docking the service satellite from the serviced satellite to provide re-orbiting of the serviced satellite.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 4A, 4B, 4C, 4D, 4E and 4F schematically illustrate the structure of the grasping ends of the gripping arms and the way they interface with a rim of an interface ring of a serviced satellite, according to embodiments of the present invention;

Figure 1A:
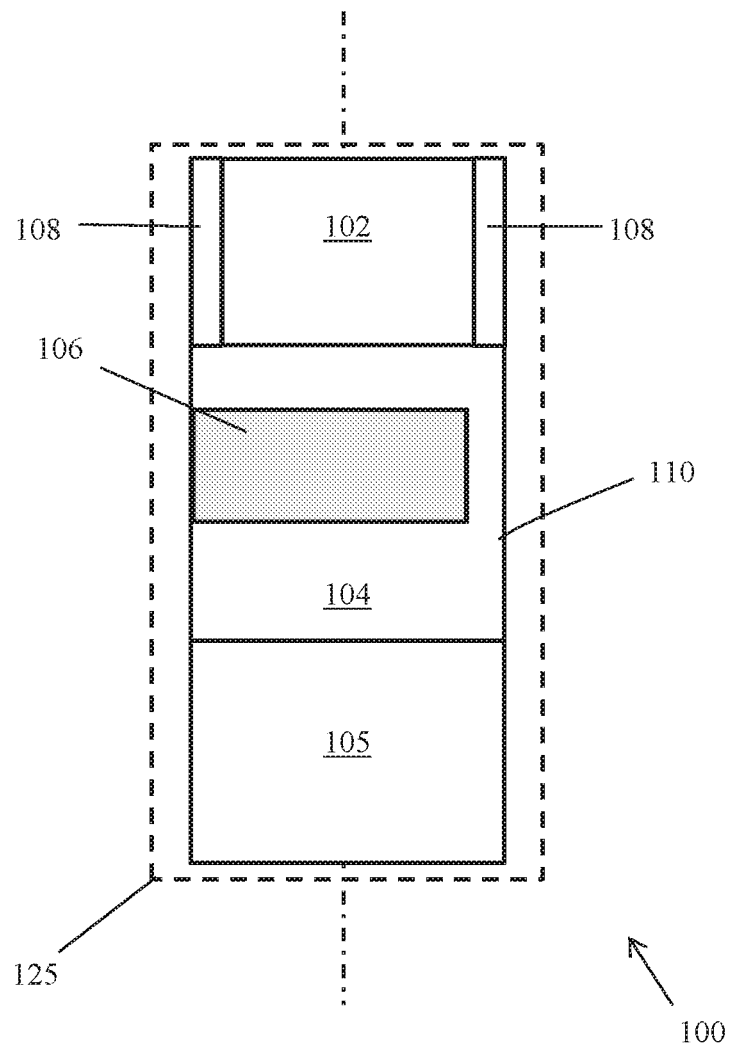
FIG. 1A is a functional block diagram illustrating a service satellite in its stowed position according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", "allocating", "checking", "receiving", "selecting", "comparing", "reporting", "recording", "detecting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

As used herein, the term "storage unit" may refer to any apparatus, device, system and/or array of devices that is configured to store data, for example, video recordings. The storage unit may include a mass storage device, for example Secure Digital (SD) cards, an optical storage device such as a CD, a DVD, or a laser disk; a magnetic storage device such as a tape, a hard disk, Redundant Array of Independent Disks (RAID), Direct-Attached Storage (DAS). Each of the storage units may include the ability to write data to the storage and read the data from the storage unit for further use, e.g., video files may be read from the storage unit, upon a request, for example, when an investigation of an incident is required. The memory may be a non-transitory computer-readable storage medium that may store thereon instructions that when executed by a processor cause the processor to perform operations and/or methods, for example, the method disclosed herein.

The present invention relates to a service satellite which is designed to dock with any satellite which includes a standard interface ring (IR) (e.g., Ariane separation ring) between the launcher and the satellite. The service satellite includes a universal docking mechanism that is capable of docking with the standard interface ring of the satellite without preliminary preparation of the serviced satellite. The service satellite is designed to service satellites, primarily geostationary satellites and LEO (low earth orbit) satellites, but is not limited to these types of satellites. While the service satellite can be of any desired shape and size, it can be implemented as a small satellite that conforms to the auxiliary payload limitations and constraints, as defined by the launch authority, for example, ESPA-class. Preferably, each service satellite can service multiple satellites to be serviced, one at a time. In particular, the service satellite can provide selected in-orbit services, for example, station-keeping to extend the life of satellites at the end of their propellant, relocation to new orbital slots, reutilization of inclined satellites, orbit correction for misplaced satellites, and deorbiting end-of-life satellites.

Figure 1B:
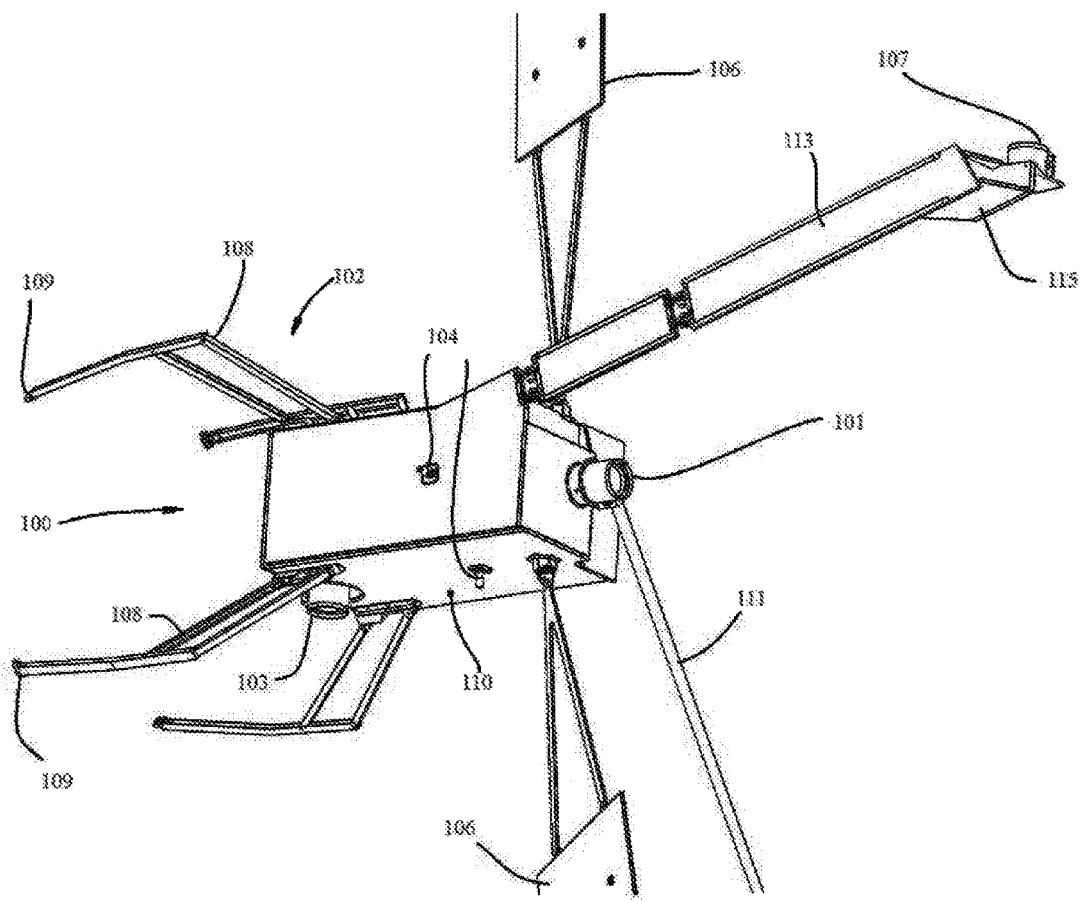
FIG. 1B is a schematic illustration of the service satellite of FIG. 1A in a deployed position according to some embodiments of the present invention.

Reference is made to FIGS. 1A and 1B, which schematically illustrate a service satellite 100 in its stowed position as a functional block diagram and in a deployed position, respectively, according to embodiments of the present invention. Service satellite 100 has a structure which permits it, in its stowed position, to have external dimensions allowing it to be contained in an auxiliary payload space 125 of a launching vehicle, demonstrated by a dashed line rectangle, as defined by the launcher authority. Preferably, the service satellite has dimensions that fall within the criteria of an EELV Secondary Payload Adapter (ESPA) or AQUILA, for cost reduction purposes, or any other auxiliary payload standard. These definitions change from time to time and are different for each launcher. The dimensions of the service satellite will be selected according to the requirements of the selected launcher. Some non-limiting examples of suitable dimensions for a micro-satellite are 60-100 cm width, 60-100 cm length, and 80 to 150 cm height, with a launch weight that does not exceed the auxiliary payload weight limit, which can be, for example, 150-400 kg, depending on the launch vehicle. It will be appreciated that the service satellite, when designed as a micro satellite according to the present invention, can be incorporated in a piggy-back payload, where the main spacecraft in the launcher holds the secondary one. In this case, the dimensions can be even larger. It will be apparent that other physical limitations may also apply, limiting the size and weight of the satellite accommodated in the auxiliary payload volume.

Figure 1C:
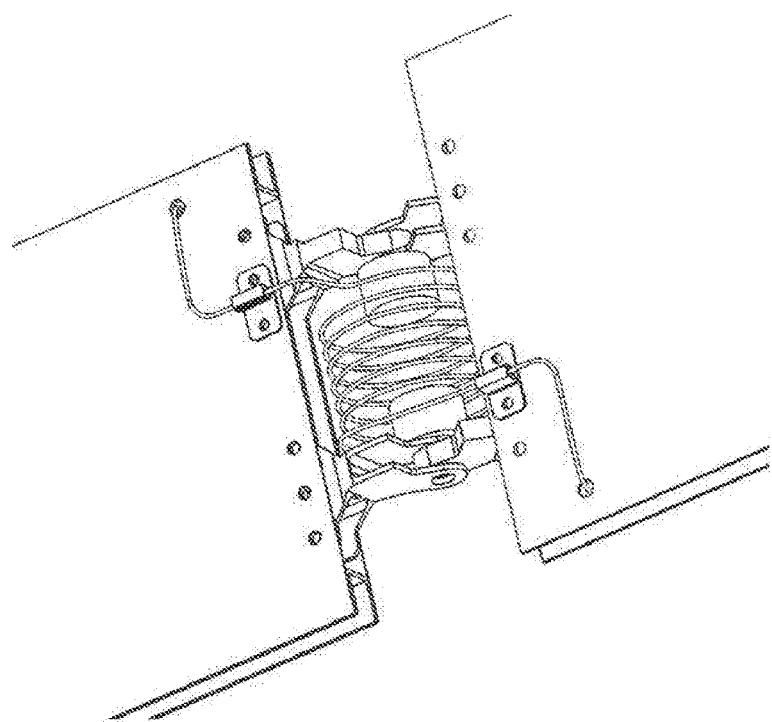
FIG. 1C is a schematic illustration of a deployment mechanism of the service satellite of FIG. 1A according to some embodiments of the present invention.

The micro satellite was designed to fit these limitations in the stowed position. Special care was given to the size of the array of solar panels, the propulsion system design and the data transmission antenna. The folding solar panels provide a very large amount of power from a very limited initial stowed volume. It will be appreciated that the array is substantially larger than the satellite body. The propulsion system includes a pair of thrusters that work together to achieve the system requirements. These thrusters are mounted at a very large distance from one another, which is much longer than the actual length of the satellite. This is achieved by using a deployable boom to deploy one of the thrusters. The deployment mechanism may include a helical tube that is capable of performing the rotation needed and transferring propellant from the propellant tank to the deployed thruster, as shown in FIG. 1C. A data transmission antenna is also attached to a deployable boom that elongates after the launch to a significant length, allowing the antenna to transmit beyond the serviced satellite's "shadow". Similarly, the docking mechanism according to this embodiment of the present invention includes a plurality of deployable gripping arms that can be folded for stowing inside the payload envelope. These structural features allow minimization of the overall size of the service satellite. Service satellite 100 has a body 110 on which is mounted a gripping unit 102, typically located at one end of service satellite 100, which is designated the Nadir end. Gripping unit 102 includes a set of gripping arms 108 which, in their stowed position, do not protrude outside of the auxiliary payload envelope 101. Service satellite 100 further includes a control unit 104 in body 110. Control unit 104 is in communication with a ground station (not shown) which operates the service satellite for receiving mission instructions, as known in conventional satellites. Control unit 104 serves to control the deployment and operation of the various components of the satellite. While control unit 104 preferably acts as an independent controller when fulfilling mission requirements, it can, itself, be assisted by the ground station for certain calculations.

A propulsion unit 105 is also provided in satellite 100, in this case including three thrusters 101, 103 and 107 (seen in FIG. 1b) disposed about the satellite, as described in detail below, to allow the various operational modes. Satellite 100 further includes a set of deployable solar panels 106 and a set of receive/transmit antennas (not shown) on a deployable communication boom 111 mounted on body 110, that can be stowed within the payload envelope. The deployable solar panels 106 and the deployable antennas, when in their stowed position, do not protrude from the auxiliary payload volume limitations. PCT Application PCT/IL2013/050681 to the inventor of the present invention, published as WO 2014/024199 and titled "LOW VOLUME MICRO SATELLITE WITH FLEXIBLE WINDED PANELS EXPANDABLE AFTER LAUNCH", which is incorporated herein in its entirety, describes a plurality of possible solutions for deployable T/R antennas and solar panels. Alternatively, any other arrangement of stowable solar panels and antennas can be employed.

Control unit 104 includes a controller (an on-board processor), data storage and input/output (I/O) interface units (not shown). The controller may be configured to carry out the control assignments of service satellite 100 including receiving transmissions and location indications, receiving and processing data from the satellite sensors, data storing in the data storage unit, retrieving data from the data storage unit, running programs stored in the data storage unit that, when executed, enable performance of the operations described in this application. Among other operations, the controller is configured to navigate service satellite 100 to designated satellites that require its services, to manage the approach, rendezvous and eventually the docking of satellite 100 onto a serviced satellite, and to navigate the serviced satellite to a desired location and orbit. Preferably, the controller also is configured to manage the undocking of the service satellite from the serviced satellite and turning the service satellite to its next mission.

Propulsion unit 105 is configured to drive the service satellite to a desired location in a desired orientation and, after docking, to drive the assembly of service satellite 100 with the serviced satellite to a desired location and orbit and to perform other operations, such as station keeping, of both satellites together. Propulsion unit 105 includes two systems: a main propulsion system, which is aimed to perform the main movements of the service satellite and, after docking to the served satellite, to perform the operations and tandem movements of the pair of satellites, and a secondary propulsion system which performs faster thrust operations and attitude control operations.

The main propulsion unit may be implemented by any known means of propulsion, although the technology known as "Electric Propulsion", as its operation is enhanced by solar-derived electricity coming from the large solar panels of the satellite, is particularly suitable. This technology creates a very high efficiency propulsion system and allows a small satellite to perform a significant amount of effective work. Thus, it is suitable to be used in a small service satellite. According to some embodiments, the main propulsion system includes three electric propulsion thrusters. One is designated as 101 and is disposed near the rear or Zenith end of satellite 100. Thruster 101 provides thrust in the direction of flight of the service satellite. A second thruster is designated 103 and is located near the forward or the Nadir side of the satellite. And the third electro propulsion thruster, designated 107, is located on a boom or arm 113 extending from the body of the satellite. Thruster 107 serves as a balance thruster in station keeping and guidance operations, and is preferably located at the longest possible distance away from thruster 103. In some embodiments, the boom is a deployable boom. In other embodiments, the boom is a telescoping boom. These options are particularly useful in creating a micro satellite that must fit into specified payload dimensions. However, if space is no object, the boom can be a fixed (non-deployable) boom. In some cases, if thruster 103 is located on a swivel arm (not shown), it can perform also the tasks of thruster 101 and reduce the number of required thrusters from three to two. In this case, the thruster is arranged to alternately adopt one of two positions—a first position for propulsion in a flight direction and a second position for station keeping.

The propulsion unit also includes a secondary propulsion system which performs higher thrust operations and various attitude control operations. The secondary propulsion system includes a plurality of thrusters 109, for example, between 4 and 12, disposed across the body or envelope of the satellite, as required. These thrusters can be chemical thrusters, using their own propellant, or resistor jets or cold gas thrusters that are operating on their own propellant. Alternatively, the secondary thrusters can use the main propulsion system propellant. The propulsion unit also includes a main propellant tank for the propellant of the main propulsion system, for example, Xenon or other electric propulsion propellant, which may also serve the secondary system thrusters. Alternatively, or in addition, the propulsion system may also include a separate secondary propellant tank to serve the secondary system thrusters. The operation of the propulsion unit is controlled through the satellite's control unit 104, either independently or under direction from the main control unit at the ground station.

FIG. 1B shows the service satellite of FIG. 1A in a deployed position. The service satellite has a body, a controller and a docking unit. The docking unit includes at least two foldable, adjustable gripping arms pivotally mounted on the satellite body, each gripping arm being pivotable relative to the satellite body, and a gripping end at each free end of the gripping arms, wherein the gripping ends are adapted and configured to capture and grip a target portion of an orbiting satellite. Each gripping arm is controllable independently by the controller, which coordinates the motion of the arms.

As can be seen in the illustrated embodiment, gripping arms 108 having gripping ends 109 have been deployed towards the Nadir side of the service satellite 100, as described in detail below. At the same time, solar panels 106 are deployed behind gripping arms 108 to provide power to various components of the service satellite. Similarly, components of the propulsion unit 105 are deployed to enable service satellite 100 to propel a serviced satellite in accordance with instructions from the control unit. In this illustration, thrusters 101, 103 and 107 can be seen, with thruster 107 held in a holder 115 on the end of deployable boom 113.

Figure 2A:
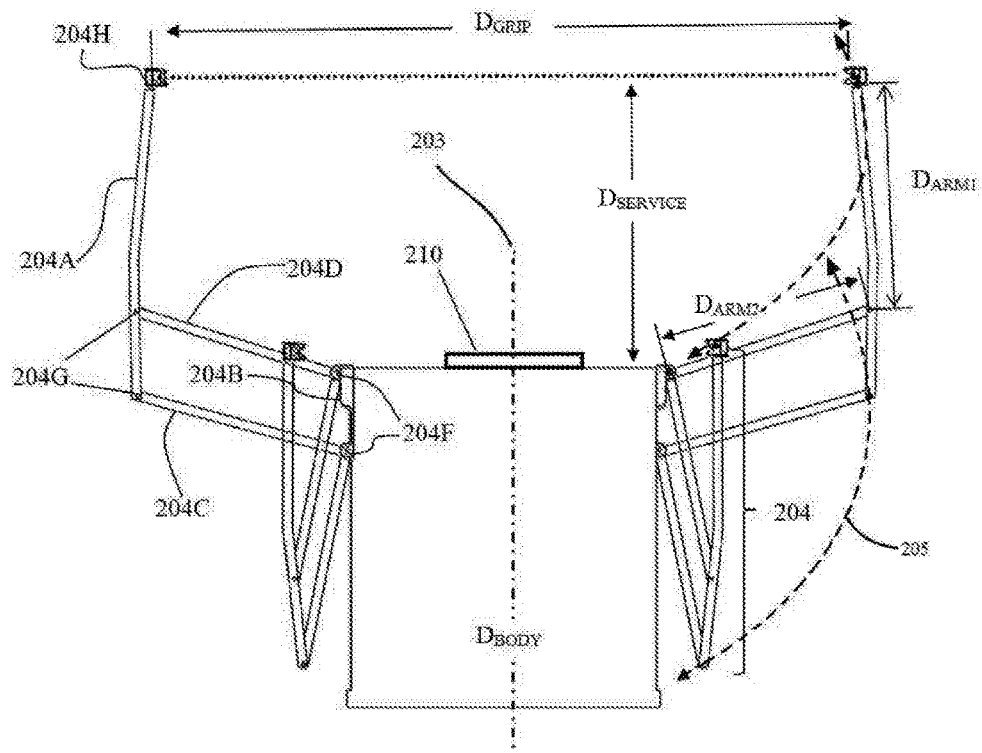
FIG. 2A is a schematic illustration of the front portion of a service satellite and a gripping unit according to embodiments of the present invention.

Reference is made now to FIG. 2A, which is a schematic illustration of the Nadir portion of service satellite 100. As can be seen, in the illustrated embodiment, the Nadir portion includes a gripping unit 202, including two pairs of pivotally coupled gripping arms 204, 204'. In the illustrated embodiment, each gripping arm 204, 204' is formed of a 4-bar linkage. One of the four bars, or links, in each mechanism is called the 'base', and it is affixed to the satellite body, as by screws. In the illustrated embodiment, each gripping arm is attached to the satellite on its own. The coordinated actuation of the 4 arms makes them one unit, but they are not physically attached to a common platform that is specific to the docking arms. It will be appreciated that, alternatively, only one pair of gripping arms co-radially disposed, can be utilized. According to other embodiments, three gripping arms are provided spaced around the satellite. It will further be appreciated that other folding and stowing options are also possible. For example, a single bar pivotally coupled to the body, or a 6 bar linkage, or another arrangement of independently adjustable arms can be provided. Alternatively, the arms can be non-adjustable. In this case, structural changes are required to provide the relative motion (tilt and/or yaw) between the service satellite and the serviced satellite, for example, mounting the thrusters on a pivoting platform.

One or more sensors 210 are provided on body 110 of service satellite 100 and configured to assist in managing approach and docking of service satellite 100 onto a serviced satellite, as described in detail below. Sensors 210 can be conventional rendezvous and docking sensors. In the illustrated embodiment, sensors 210 are disposed on the Nadir surface although, alternatively, they can be disposed elsewhere on the satellite, such as on the side panels. Each of gripping arms 204, 204' may be constructed, generally, as a 4-bar linkage, with a gripping or grasping end 204H at its free end. The 4-bar linkage includes an operational rod 204A, which is pivotally connected in two locations along its length to first ends of two cranks 204C and 204D of the 4-bar linkage of gripping arm 204. The fourth element of the 4-bar linkage is a stationary rod 204B, which may be pivotally connected in two locations along its length to the second ends of cranks 204C, 204D, thus forming the 4-bar linkage of gripping arm 204. Alternatively, the second ends of cranks 204C, 204D, may be pivotally connected directly to the service satellite body, eliminating the need for the base link 204B. Cranks 204C and 204D may be connected, at one of their ends, via pivots 204F to stationary rod 204B and, via pivots 204G, to rod 204A, thus enabling operational rod 204A to remain substantially parallel to stationary rod 204B throughout its deployment movement. On the other hand, according to other designs, the rod angle is significantly different during deployment. It will be appreciated that stationary rod 204B may be attached to the side of the body of satellite 100 or may be realized as part of the side of the body of satellite 100.

The 4-bar linkage structure of gripping arm 204 allows operational rod 204A to move about pivots 204G and allows cranks 204C and 204D to move about pivots 204F.

The movement of operational rod 204A may be, at one extreme end of its movement range, to a stowed position where operational rod 204A is fastened to the side of the body of gripping element 202 or even stowed in a dedicated recess made on the side of the body of gripping unit 202. Operational rod 204A may move, in the other direction of movement, to a deployed position and then to one of several gripping positions. This movement is exemplified by arrow 205. The amount of movement of gripping arm 204 from one position to another position and the amount of exerted gripping force applied by arm 204 in its gripping position can be precisely controlled, as is explained in detail below. The movement of each of gripping arms 204, and the location at which it is stopped, can be controlled separately and independently of each other, although the arms preferably are coordinated with each other. That is, they do not necessarily move together. It is possible that one arm would move alone, but the control unit should coordinate the movement of each arm with the posture or movement of the others. The independent and mutually separate movement of each of gripping arms 204 provides high flexibility in performing the tasks of service satellite 100, where it is often desired that tandem operation be asymmetrical.

It will be apparent to those skilled in the art that proper functionality of gripping arm 204, according to embodiments of the present invention, may be achieved with a structure of the arm which is not necessarily an exact parallelogram. For example, one of cranks 204C, 204D may be slightly shorter than the other, causing the movement of operational rod 204A to not be exactly parallel to stationary rod 204B. In short, any structure that enables controlling the movement and operation of operational rod 204A in general, or enabling the movement and operation of gripping end 204H, in particular, in all of the operational positions and for all of the tasks described herein below can be utilized. For example, the structure of arms 204 should enable gripping ends 204H to be positioned, when approaching grasping position, at geometric locations that are proximal to a defined perimeter of the object to be gripped and to predefined locations on that perimeter line. For example, if the object to be gripped is a communication satellite or "ComSat" and the intention is to grip it by gripping its interface ring (IR), the predefined perimeter is a planar circle and the locations around that circle may be four points (in case of service satellite quipped with four arms) spaced apart around the circle.

Further, the exact structure of gripping end 204H of arms 204 may be selected so as to enable engagement of predefined structures of the objects to be gripped, while leaving enough slack or mechanical freedom for each of the gripping ends 204H to engage the gripped object at variable relative angles. This leaves sufficient flexibility for service satellite 100 to engage the object in a controllable relative angle between the longitudinal axis of the service satellite and a reference axis of the gripped object, as is exemplified according some embodiments described herein below.

The rendezvous and docking tasks of service satellite 100 may be performed in one of two main modes—semiautomatic and fully autonomous. In order to enable accurate and safe rendezvous and docking, one or more sensors 210 may be installed, for example, at the Nadir side of service satellite 100 (the side of satellite 100 facing gripping ends 204H when arms 204 are deployed) so that the region in which the serviced satellite is expected to be sensed is within the reach of these sensors. Sensors 210 may be, for example, one or more of the following sensors: a video camera, to form a 2D image from which the relative position and speed can be derived using image processing algorithms, or a number of video cameras, to form a 3D image and derive distance measurements out of the 3D image, a range detector, a short range RADAR LIDAR—(Light Detection and Ranging) device, an illuminator device, an infrared sensing device. Readings of sensors 210 may be received by the controller of the service satellite and be processed according to the specific mission. Alternatively, the readings of sensors 210 can be downloaded to the ground station, processed there and the ground station will return a command based on the processed data. Based on the processing of these readings and based on the program of the specific mission, the controller issues directing commands to the various systems including the propulsion units of the service satellite, such as unit 105 in FIG. 1, to direct service satellite 100 to the correct location and orientation relative to the serviced satellite.

Figure 2B:
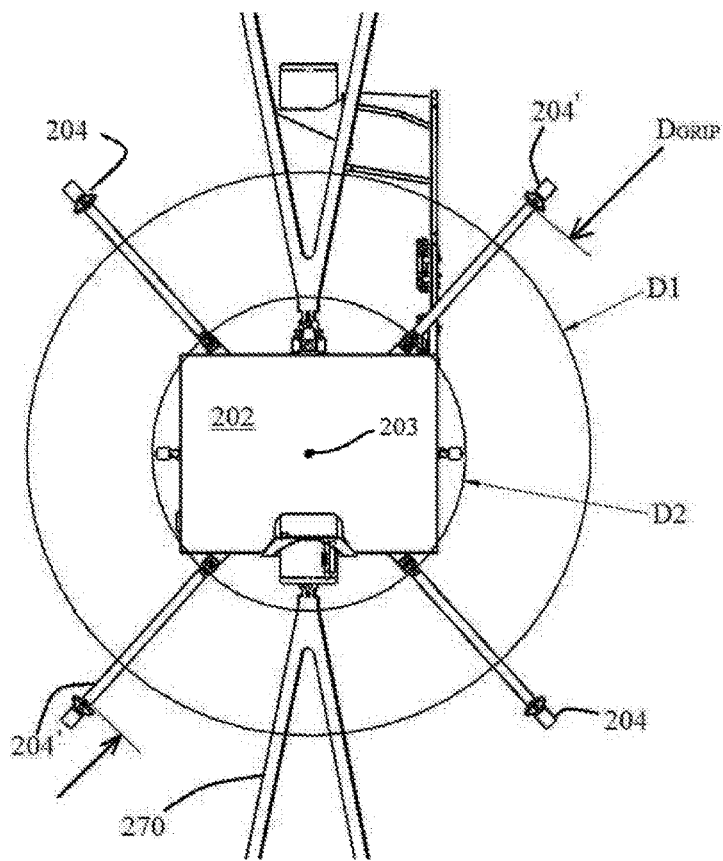
FIG. 2B is a schematic illustration of the service satellite of FIG. 2A with gripping arms deployed according to embodiments of the present invention.

Referring now to FIG. 2A, when gripping arms 204 are in their operational position (deployed position or grip position), their gripping ends 204H may reach a distance $D_{SERVICE}$ in front of the front end of gripping unit 202. $D_{SERVICE}$ is dictated by the length of $D_{ARM1}$, extending between the pivot connection of crank 204D and operational rod 204A, and the length $D_{ARM2}$ of crank 204D, and by angle $\alpha_{DEPLOY}$ (FIG. 3B) between operational rod 204A and crank 204C. The distance $D_{GRIP}$ between two opposing gripping ends 204H of gripping arms 204 is generally dictated by the length $D_{ARM2}$ of crank 204D and the dimension $D_{BODY}$, which is the width of the body of gripping unit 202 between rods 204B of two opposing arms 204. Generally, distance $D_{GRIP}$ may range between ($D_{BODY}+2\times D_{ARM2}$) and $D_{BODY}$, so that satellite 100 is essentially a universal service satellite. This wide range of operational aperture of $D_{GRIP}$ allows high flexibility in enabling a single service satellite 100 to provide service to a variety of serviced satellites, as is explained in detail herein below and as exemplified in detail in FIG. 2B, to which reference is now made. FIG. 2B schematically presents examples of different diameters D1, D2 of interface rings frequently used on ComSats and the relative operational aperture $D_{GRIP}$ of gripping arms 204, 204' according to embodiments of the present invention.

FIG. 2B shows a schematic front view of gripping unit 202 of a service satellite, such as satellite 100, taken along its longitudinal axis, with gripping arms 204 and 204' extended in a certain operational position prior to gripping a serviced satellite, or after releasing one. Solar panels 270 can be seen deployed behind gripping arms 204. Center point 203 of circles D1 and D2 substantially overlaps the projection of the longitudinal axis 203 (shown in FIG. 2A) of unit 202 in the drawing. Each one of circles D1 and D2 represents the external perimeter of an interface ring of a certain group of satellites. Circle D1 refers to interface rings of relatively large diameter, e.g., nominal diameter 1666 mm; while circle D2 refers to interface rings of relatively small diameter, e.g., nominal diameter 937 mm. As seen in FIG. 2B, the operational opening aperture $D_{GRIP}$ of any two opposing pair of gripping arms 204, 204' exceeds the largest diameter D1 of the different interface rings, thus ensuring the capability to interface with any interface rings having diameter smaller than $D_{GRIP}$. The range of diameters that can be accommodated by a particular service satellite depends on the design of the gripping arms and their ability to engage the interface ring at an angle. It will be apparent that the above given diameters are examples only, and a large range of other diameters or interface arrangements having shapes other than circles may be used.

Figure 3A:
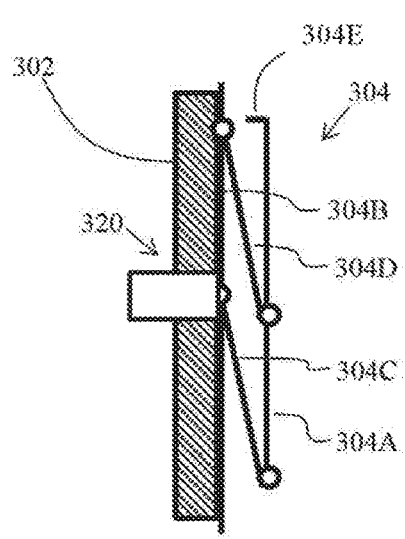
FIGS. 3A and 3B schematically present deployment mechanisms according to embodiments of the present invention.
Figure 3B:
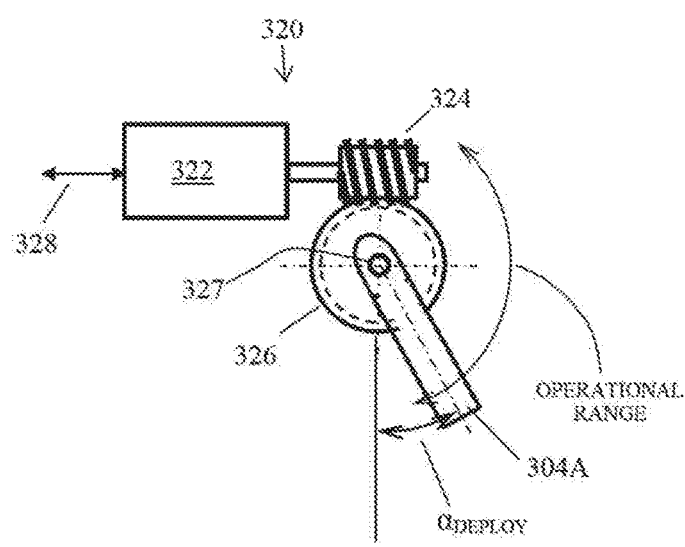

Reference is made to FIGS. 3A and 3B, which schematically present a deployment mechanism 320, according to embodiments of the invention, which is configured to control the deployment angle $\alpha_{DEPLOY}$, thereby controlling the operation of a gripping arm, such as gripping arm 204. Deployment mechanism 320, in the illustrated embodiment, includes a motor 322 which is configured to rotate a helical cogged wheel 324. Helical wheel 324 is adapted to drive a cogged wheel 326 about a pivot 327. This arrangement can serve as one of pivots 204F in each arm 204, thereby controllably changing deployment angle $\alpha_{DEPLOY}$. Motor 322 preferably is an electrical motor and its operation preferably is controlled by the controller of the service satellite. Alternatively, the ground station can control the motor, via an appropriate driver to translate commands for appropriate power switching. The actual momentary value of $\alpha_{DEPLOY}$ may be measured or deduced using a location or angle indicator known in the art, such as an absolute encoder, a relative encoder, electro optical measurements, and the like. Furthermore, a method of image processing and a suitable algorithm analyzing the location of the docking arms in the field of view of an optical camera can be used to determine the value of $\alpha_{DEPLOY}$. Deployment mechanism 320 may communicate with the controller via a control line 328. It will be apparent to those skilled in the art that the deployment mechanism may be realized using other arrangements, all of which are in the spirit of embodiments of the present invention, as long as they are adapted to provide the required accuracy of control of $\alpha_{DEPLOY}$ and are configured to be powered using a power source that is available as long as the mission of the service satellite lasts. In order to enable high compatibility of a service satellite according to embodiments of the present invention to a variety of different serviced satellites, space crafts and other space objects, such as space debris, the gripping mechanism of the present invention is designed and adapted to attach to an object through its interface ring, which is a part of most conventional satellites. The interface ring is the connection element connecting a satellite to its launching missile, and it has one of a certain set of dimensions adopted by most of the satellites and launching industry as an industry standard. For example, the nominal diameter $D_{IF\_RING}$ of an interface ring may range from 937 mm to 2624 mm with ring width RW ranging from 4 mm to 12 mm for most existing commercial satellites.

The controller of the service satellite is configured to actuate the gripping arms to move to a gripping position at a selected distance from one another so as to grip the target portion of the serviced satellite. Reference is made now to FIG. 4A, which schematically represents the structure of gripping ends 404A of gripping arms 404 and the way they may interface with an interface ring of a serviced satellite 410, according to embodiments of the present invention. In these embodiments, each gripping end 404A includes a recess 404B configured to engage an interface ring 412 of a serviced satellite. The distance $D_{GRIP}$ between two opposite gripping arms 404 of a gripping unit may be set to be at least slightly longer than $D_{IF\_RING}$ to allow the service satellite to access the interface ring of a serviced satellite. In this way, each recess 404B of gripping ends 404A of gripping arms 404 is moved opposite a portion of the interface ring in a way that will allow that portion of the interface ring to smoothly be inserted into the respective recess 404B when the distance $D_{GRIP}$ is slowly closed to effect grasp of the interface ring by gripping arms 404. The reduction of the magnitude of $D_{GRIP}$ in order to effect grasping of the interface ring may be done by way of change of angle $\alpha_{DEPLOY}$, as was described in detail with reference to FIGS. 3A and 3B, or in any other controllable fashion.

Reference is made also to FIGS. 4B, 4C and 4D which schematically present three different values of a relative angle of grasping of an interface ring, according to embodiments of the present invention. As may be seen in FIGS. 4A, 4B and 4C, grasping end 404A may approach the interface ring at different relative angles $\alpha_{RING\_1}$, measured between the plane of the interface ring and gripping arm 404 in a plane between arm 404 and a radial of the interface ring extending from the gripping point to the center of the interface ring. As can be seen, a range of different relative angles $\alpha_{RING\_1}$ can be used while maintaining grasping capabilities. Since gripping end 404A has a recess 404B with width DGRSP-W larger than the width of the interface ring 412 of the serviced satellite, some flexibility is provided in the access angle of each gripping end 404A. It will be appreciated that when the docking process reaches its final stage and the service satellite is docked to the serviced satellite, in some embodiments, the grasping angle may be substantially as illustrated in FIG. 4D. To better position gripping ends 404A before tightening the gripping arms, reaction wheels (not shown) can be activated to shake or vibrate the service satellite during final closure of the arms. It will be appreciated that the gripping force of the arms in the docked position should be strong enough to prevent detachment of the interface ring due to arm flexibility during tandem maneuvers.

Figure 4E:
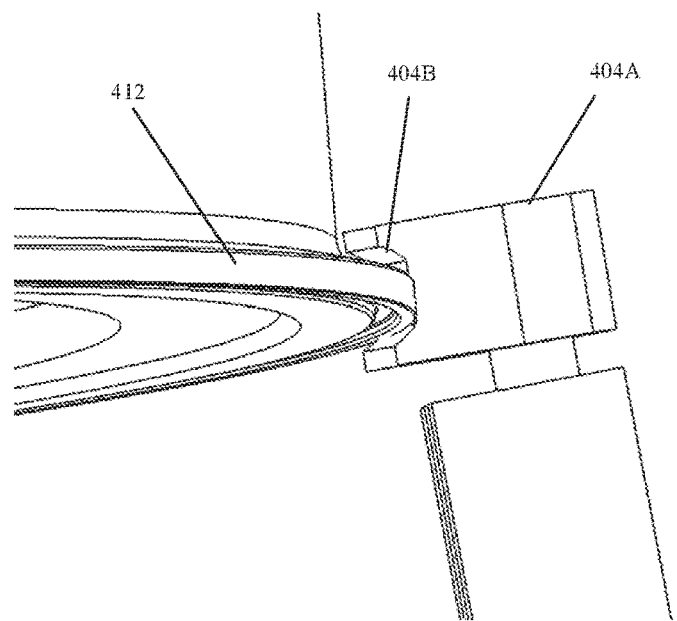

Reference is made now to FIG. 4E which is a partial isometric view of a gripping end 404A attached to an interface ring 412 according to embodiments of the present invention. As may be seen, the opening of recess 404B of gripping end 404A of a gripping arm 404 is wider than the width of the interface ring, thus allowing certain degrees of freedom of the relative angles between arm 404 and the interface ring 412, thus allowing secured grasping of the interface ring by a set of gripping arms 404 at a variety of relative angles.

Figure 4F:
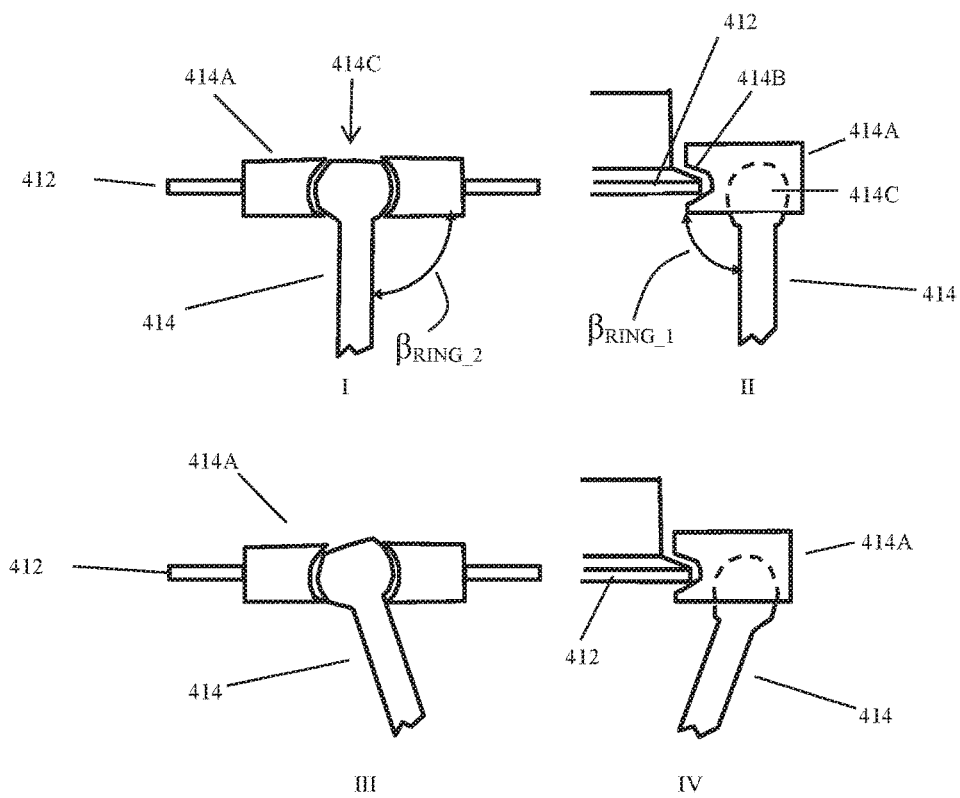

Reference is made now to FIGS. 4FI, 4FII, 4FIII and 4FIV, schematically representing the structure of a gripping end 414A of a gripping arm 414 according to alternative embodiments of the present invention at different gripping angles. According to some embodiments of the present invention, gripping arm 414 includes gripping end 414A having a gripping recess 414B. Gripping end 414A is attached to gripping arm 414 via a spherical joint 414C, allowing three degrees of freedom in relative angles $\beta_{RING\_1}$ and $\beta_{RING\_2}$ measured between gripping arm 414 and gripping end 414A in three perpendicular planes. According to this embodiment, gripping ends 414A may maintain the direction of grasping dictated by the interface ring while gripping arms 414 retain three degrees of freedom of the respective relative angles between gripping arm 414 and gripping end 414A.

Figure 11A:
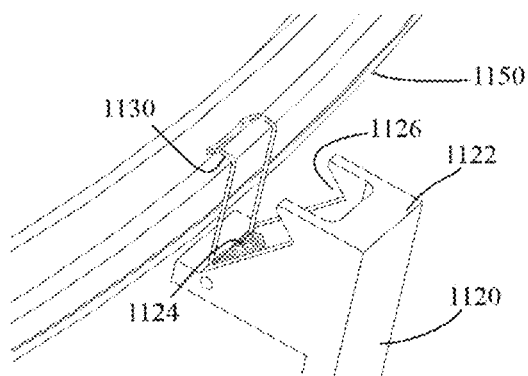
FIGS. 11A-11C' illustrate schematically one method of gripping a serviced satellite, according to embodiments of the invention.
Figure 11A:
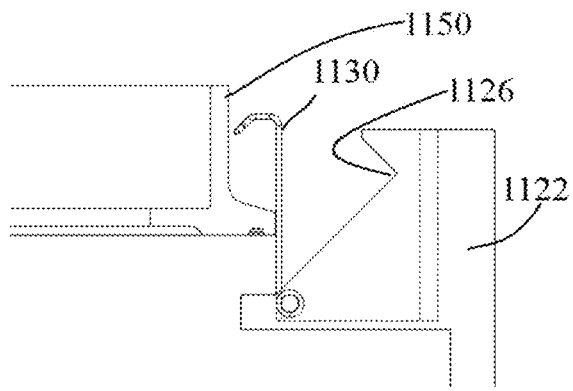
Figure 11B:
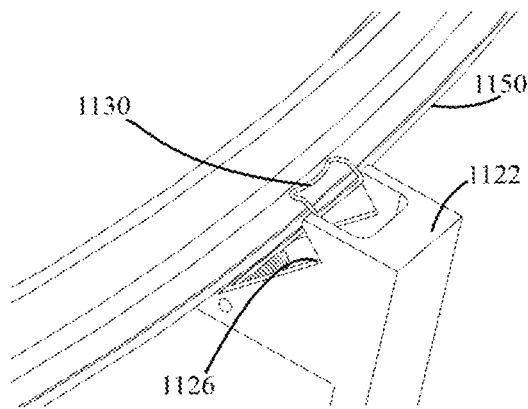
Figure 11B:
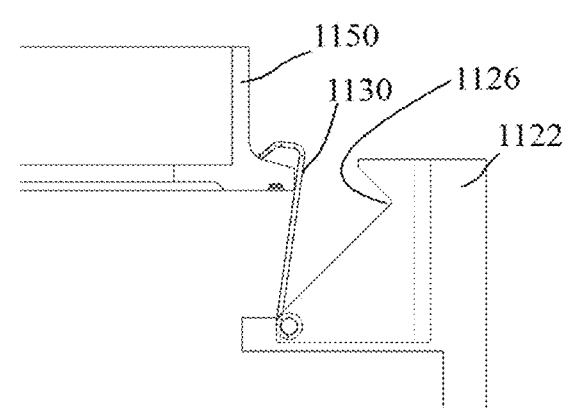
Figure 11C:
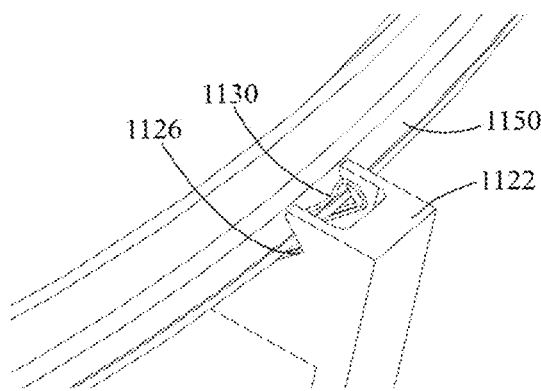
Figure 11C:
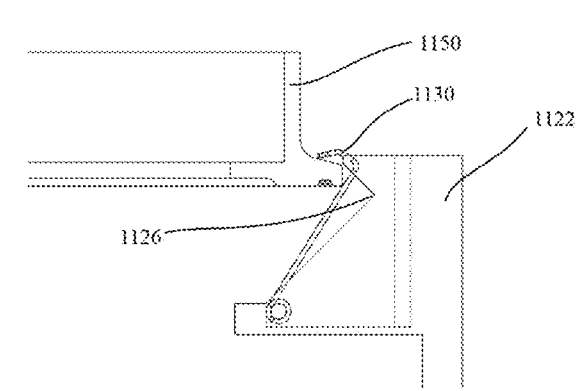

It will be appreciated that, alternatively, any other suitable arrangement coupling the gripping arm to the gripping end, and any other appropriate shape of recess in the gripping end can be utilized. For example, if a large inaccuracy in relative position between the service satellite and the serviced satellite is expected, the gripping end can be designed to tolerate this large inaccuracy. One exemplary option is by incorporating a guiding hook spring in the gripping end, that will capture the interface ring within a wide enough flexible recess and, during the gripping movement of the arm, will guide the converging rigid recess of the gripping end onto the interface ring. One implementation is illustrated schematically in FIGS. 11A-11C. In FIG. 11A, the gripping end 1122 of a gripping arm 1120 can be seen, with a spiral guiding hook spring 1124 disposed in a recess 1126 therein. As the gripping end 1122 approaches the interface ring 1150 of the serviced satellite, the edge of the ring is engaged by the hook end 1130 of spring 1124. Gripping end 1122 continues to approach, and pushes the spring 1124 against the interface ring 1150, pushing the spring into the recess 1126 in the gripping end, as seen in FIG. 11B. As gripping end 1122 continues to approach, edge 1150 of the interface ring slides along spring 1124 and until the recess 1126 holds it in a desired position, where it is held in place both by hook end 1130 of spring 1124 and by recess 1126 of gripping end 1122.

Figure 12A:
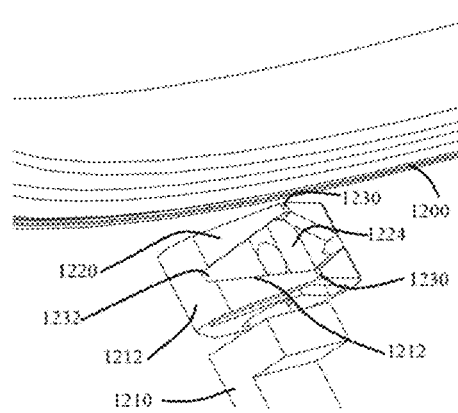
FIGS. 12A-12F illustrate schematically one method of gripping a serviced satellite, according to embodiments of the invention.
Figure 12B:
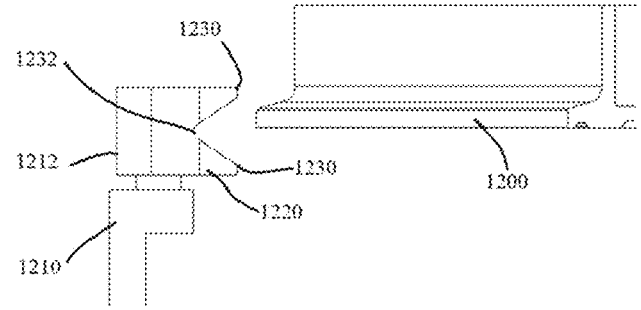
Figure 12C:
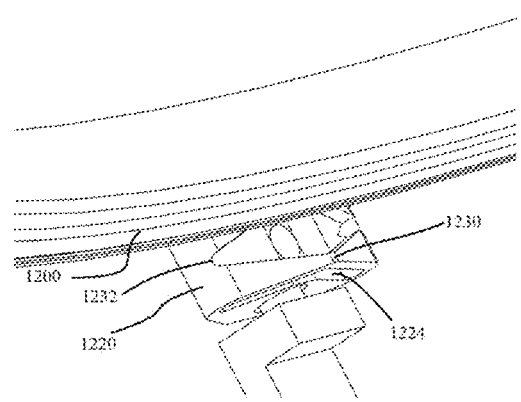
Figure 12D:
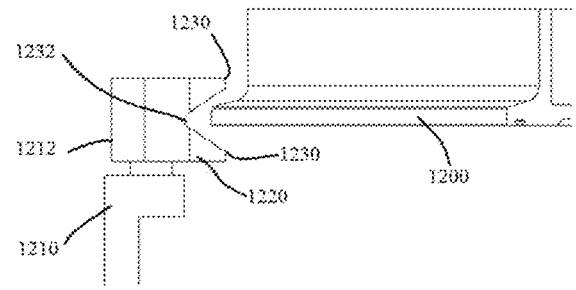
Figure 12E:
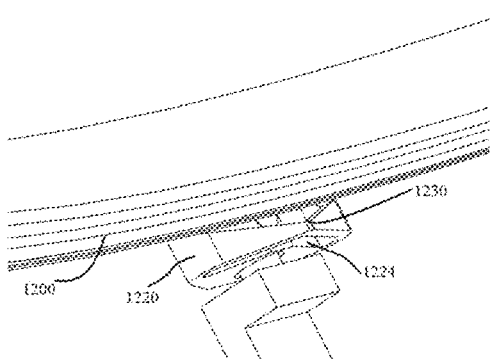
Figure 12F:
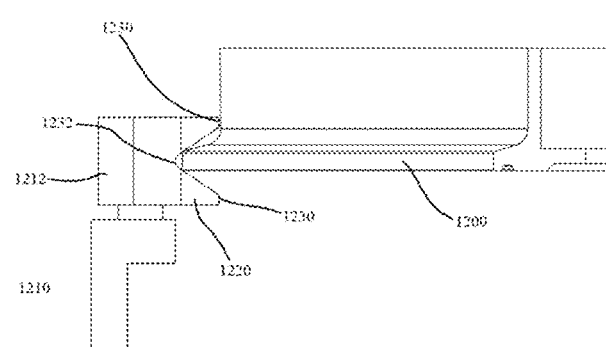

Another implementation is illustrated schematically in FIGS. 12-12F. In FIGS. 12A and 12B, the gripping end 1212 of a gripping arm 1210 can be seen preparatory to capturing the target portion 1200 (here, the interface ring) of a serviced satellite. Gripping end 1212 includes a protruding profile 1220 defining an aperture 1222 to a recess 1224 in the gripping end. Profile 1220 includes protruding top and bottom capture elements 1230 which extend towards the target portion and provide a wide aperture to capture the target portion at a variety of approach angles. Profile 1220 tapers to define narrow side portions 1232 of aperture 1222 which serve to grip the target portion 1200 when the gripping portion is closed about the target portion. Thus, this embodiment provides convergence of the profile from a large gap between one point in the middle to a small gap at two distant points on the sides of the gripping end. This structure provides stability during angular movements of the serviced satellite.

Alternatively, the gripping end can have multiple recesses, or even a knurled interfacing surface, to allow engagement at an arbitrary point over the gripping surface of the gripping end. The ability to align the serviced satellite to the appropriate thrusting axes, as described below, together with the three limited angular degrees of freedom between the gripping ends and the gripping arms eliminates the need to converge with the interface ring, or any other interface element on the target, into an exact predetermined point on the gripping end.

It is a particular feature of the invention that the docking is non-intrusive, i.e., the service satellite does not protrude into any void or part of the serviced satellite which is not fully exposed to the outside and, therefore, cannot be inspected prior to docking, for example, the inner compartment of the apogee thruster nozzle. Also, gripping is implemented by at least two arms, so release and abort after docking for safety or emergency reasons is very reliable. It is sufficient to open half of number of arms in order to enable emergency abort.

A method of docking according to embodiments of the invention is as follows. The service satellite is launched to its destined service orbit, directly or through a transfer orbit. Before the actual service mission, in-orbit tests will be performed to validate functionality. The satellite will arrive at its dedicated slot, preferably a vacant slot in proximity to a satellite cluster of potential serviced satellites.

The service mission will start by a drift phase, which is meant to reach a serviced satellite, also referred to as a customer, in the geostationary belt. According to the customer's location, the satellite will be uploaded with a customer's waypoint and start to drift east/west according to the shortest calculated route. When approaching the expected customer location, the service satellite will search for the intended serviced satellite by using on-board optical sensors, e.g., the LIDAR sensor. As it approaches the rendezvous position, the service satellite will detect and measure the relative position of the serviced satellite using on-board sensors, e.g. a camera. The measurements will be fed to the control unit that will, in turn, activate the propulsion system in order to reach the rendezvous position—a predetermined relative position between the two spacecraft, suitable for docking. It will be appreciated that data of the required station keeping adjustments of the serviced satellite are also fed to the control unit. In this way, the rendezvous position can already include a gross desired yaw angle between the service satellite and the serviced satellite.

The docking phase begins when the satellite is at the appropriate rendezvous distance from the serviced satellite, at a zero full stop relative velocity. The rendezvous distance is a function of the target element size to be gripped, since the geometry of the docking system implies that the gripping ends move forward as the gripping diameter $D_{GRIP}$ gets smaller. Upon command, the service satellite will dock using all its docking arms in simultaneously. The docking arms will start closing on the target using their electric thrusters, first until the target element, e.g. interface ring, is captured among the gripping ends, and then, by further motor actuation, until the arms are fully tightened to the target element.

The quality of the grip may be indicated by sensors, e.g. the camera or other dedicated sensors known in the field, such as opto switches, strain gauges or the like, that will be mounted on the arms. In addition, the docking quality can be tested directly, through dynamic response of both the service- and serviced satellites to slight thrusts in various directions while docked to each other.

Figure 13:
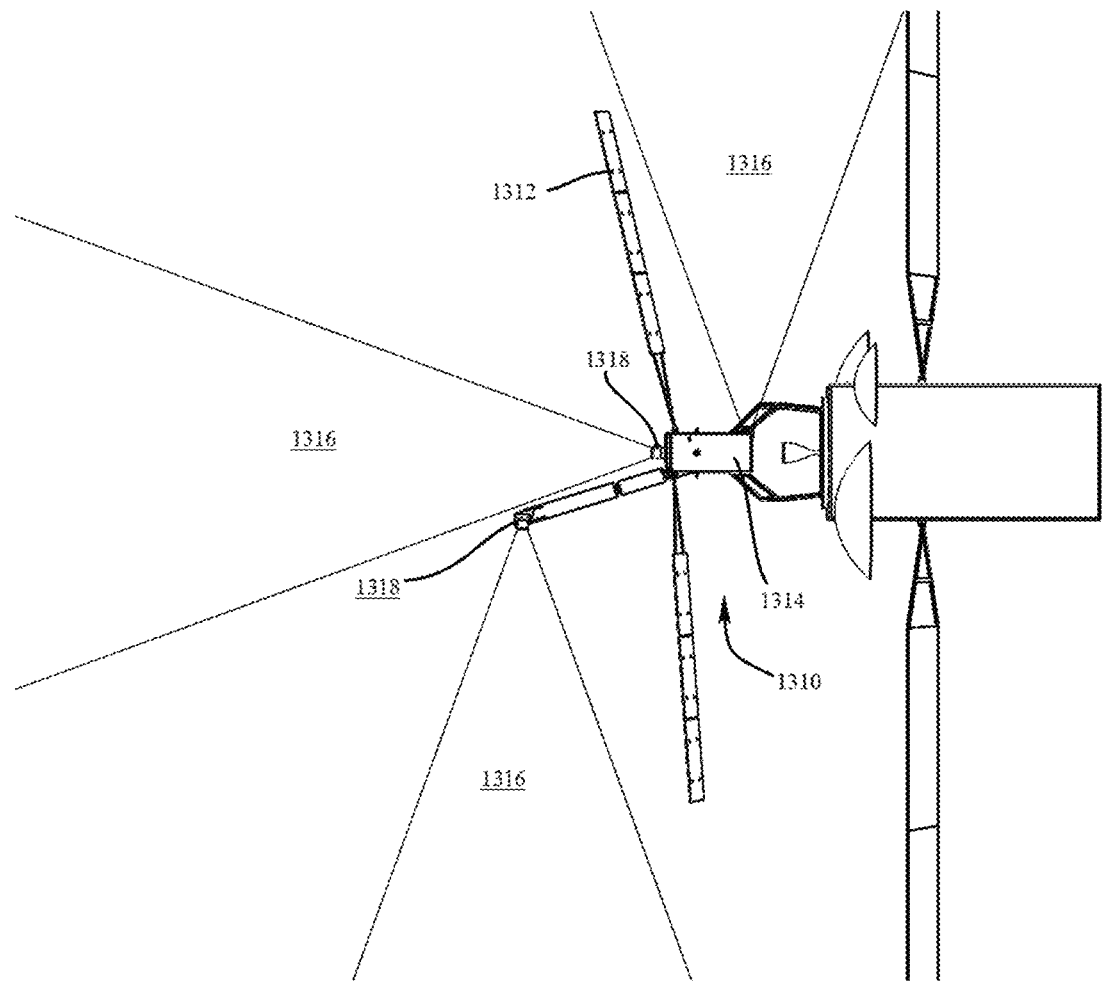
FIG. 13 is a schematic illustration of plumes of the thrusters in a satellite according to embodiments of the invention.

Preferably, docking will be performed at an angular offset of the body of the service satellite relative to the body of the serviced satellite of up to four (4) degrees eastwards or westwards, depending on the actual natural drift direction of the serviced satellite, to allow combined N/S and E/W corrections during the station keeping phase. While docked, whenever the service satellite's solar panels cast a shadow on the solar panels of the serviced satellite, they will be inverted to a perpendicular position to minimize the shadowing effect. As can be seen in FIG. 13, the solar panels 1312 of service satellite 1310 are preferably mounted at a tilt relative to the longitudinal axis of the service satellite body 1314, rather than being perpendicular thereto. This serves to prevent damage to the solar panels by the plumes 1316 of the various thrusters 1318.

Once docking is complete, the service satellite and tandem serviced satellite enter the station keeping phase. At this stage, the two satellites are joined together and must be operated as one, maintaining the customer in the allocated orbital slot within the required attitude limits. During this phase, the service satellite, which is like an external "jet pack", will be in charge of daily combined N/S and E/W SK maneuvers.

Figure 14A:
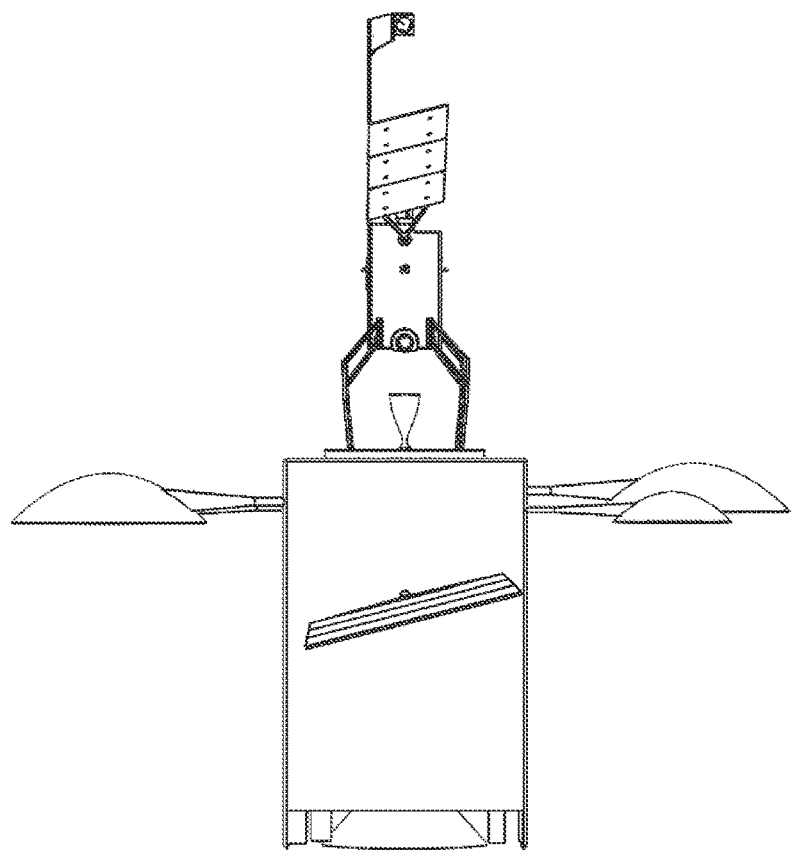
FIGS. 14A and 14B are schematic illustrations of a service satellite according to the invention tilting itself relative to a serviced satellite.
Figure 14B:
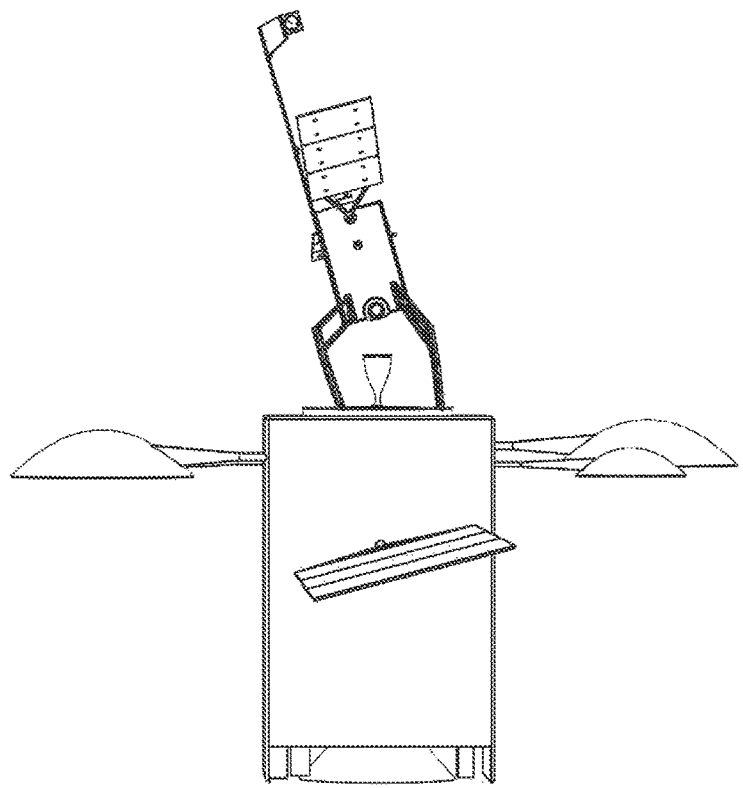

To compensate for the misalignment of the joint center of gravity (jCoG) along the X and the Y-axis, which is calculated in real time during the first couple of minutes of thrusting, the service satellite will tilt itself left or right, up or down (i.e., perpendicular to the station keeping thruster activation plane (Na-Ze/N-S plane in FIG. 8), using the docking arms. See, for example, FIGS. 14A and 143B.

Figures 5A, 5B, 5C:
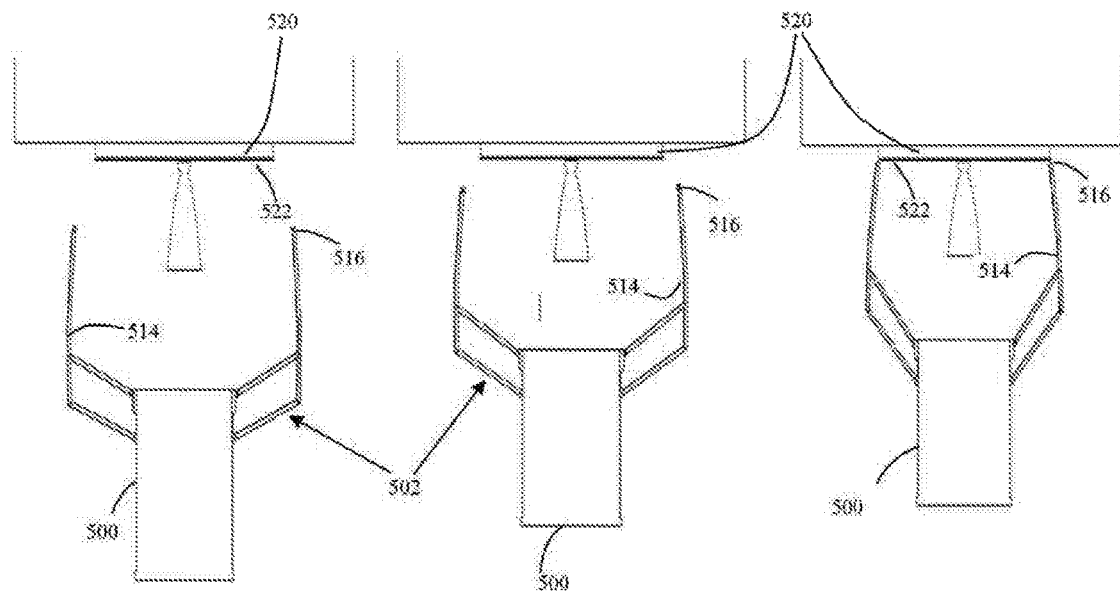
FIGS. 5A, 5B and 5C, illustrate a docking process of a service satellite to a serviced satellite, according to embodiments of the present invention.

Reference is now made to FIGS. 5A, 5B and 5C which illustrate a docking process of a service satellite 500 to a serviced satellite 520. In FIG. 5A, an approach stage is illustrated. As seen in FIG. 5A, the gripping unit 502 of service satellite 500 is in a deployed position, with gripping arms 514 extended towards the interface ring 522 as the service satellite 500 approaches the interface ring 522 of serviced satellite 520. In this illustration, only one pair of gripping arms is shown. It will be appreciated that the distance between gripping ends 516 of gripping arms 514 is larger than the diameter of interface ring 522. In FIG. 5B, the service satellite 500 has reached the rendezvous stage, where the gripping ends 516 of gripping arms 514 are located opposite the edges of the interface ring 522. Service satellite 500 can now start the final docking stage, illustrated in FIG. 5C. As seen in FIG. 5C, the docking stage ends when the interface ring 522 is firmly gripped between the gripping ends 516 of the service satellite. It will be appreciated that the same kinematics of the gripping arm that serves for deployment, serves also for gripping during the docking stage. The gripping ends 516 of all the gripping arms 514 simultaneously approach and grasp the rim of the interface ring 522, at whichever relative angle they are able. In this position, the service satellite 500 is docked to the serviced satellite 520 and can manipulate its attitude and position per instructions of the control unit.

Figures 6A, 6B, 6C:
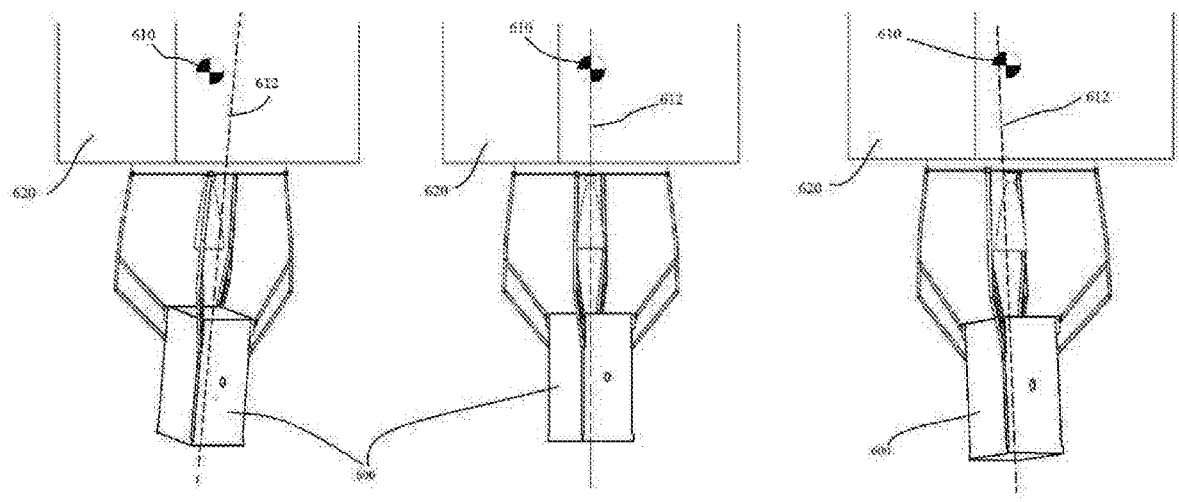
FIGS. 6A, 6B and 6C are schematic illustrations of attitude compensation, according to some embodiments of the present invention.

Reference is now made to FIGS. 6A, 6B and 6C which are schematic illustrations of attitude compensation, according to some embodiments of the present invention. As explained above, one of the purposes of docking is to relocate the serviced satellite using the thrusters of the service satellite. In order to avoid parasitic attitude perturbations of the tandem serviced satellite 620 and service satellite 600, a thrusting vector, illustrated in FIGS. 6A, 6B and 6C by an arrow 610, should be aligned through the joint center of gravity (jCoG) 612. The joint CoG 612 may not be in a constant location, and may vary with time. As changes in attitude are readily measured by the control unit of the service satellite or the serviced satellite through, for example, star trackers, a control loop can correct the misalignments that cause these attitude changes by adjusting, independently, the posture or reach of each arm, thereby tilting the service satellite relative to the serviced satellite, while maintaining proper docking, to achieve CoG alignment. In other words, alignment of the thrusters so that a thrusting vector passes through the jCoG is accomplished by setting a reach of each of the gripping arms to a desired length such that a small relative angle exists between the Ze-Na axis of the serviced satellite and the Ze-Na axis of the service satellites. Residual perturbations can be absorbed by reaction or momentum wheels, which are known in the art.

Figure 7A:
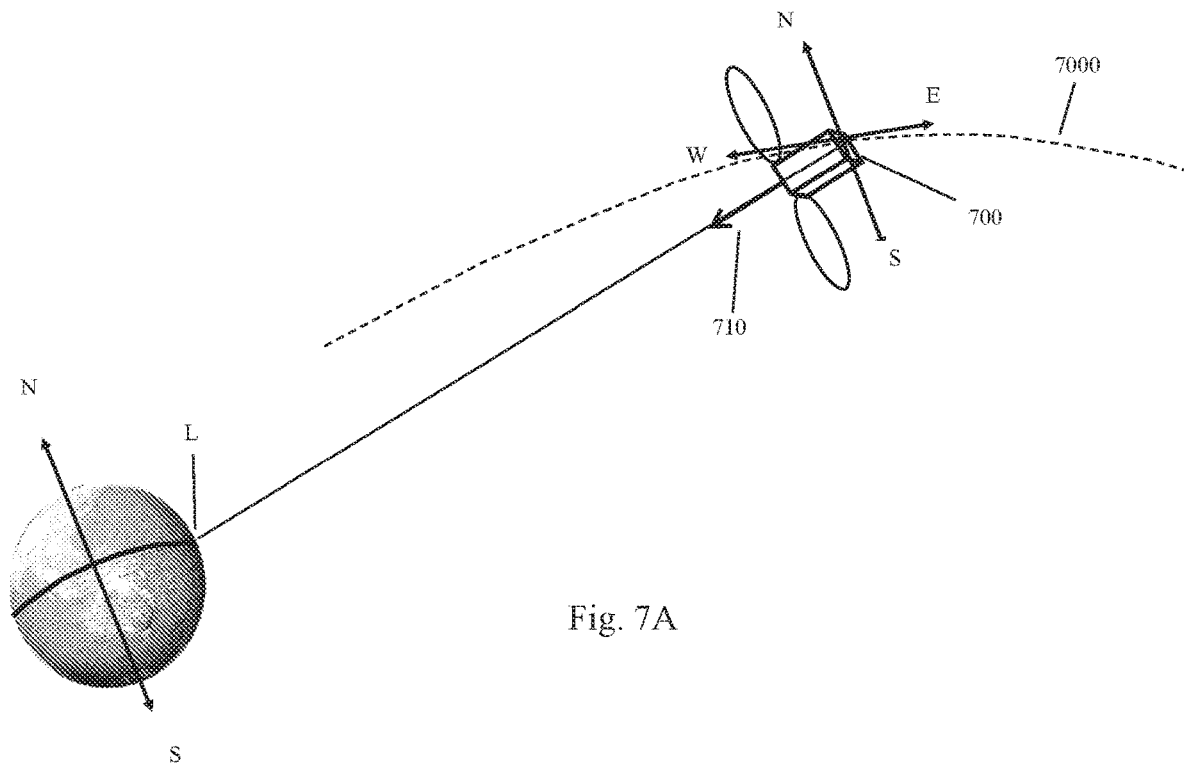
FIGS. 7A and 7B schematically present notations associated with the location and directions of a geostationary satellite.
Figure 7B:
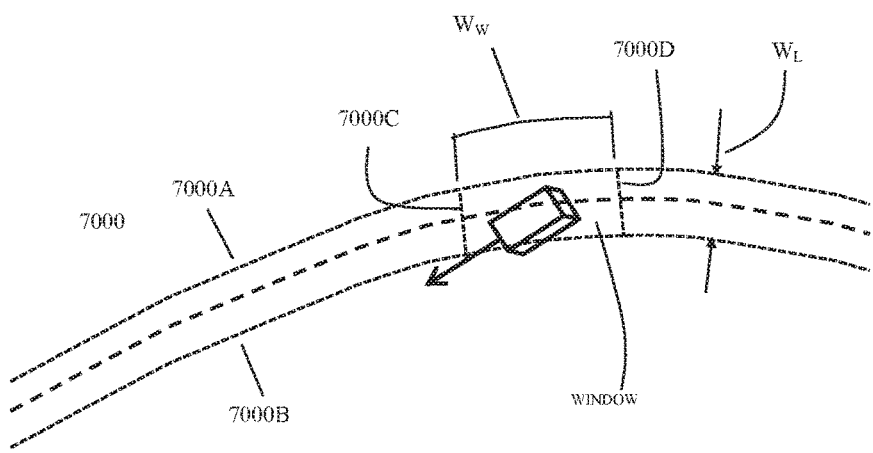

Reference is made now to FIGS. 7A and 7B which schematically illustrate notations associated with the location and directions of a geostationary satellite, such as communication satellites. Satellite 700 is a geostationary satellite orbiting in an orbit trajectory 7000 substantially above location L on the face of the Earth. The plane of orbit 7000 is parallel to the plane of the Earth's equator. Satellite 700 is aimed so that its direction of transmission 710 is aimed substantially towards location L. Direction 710 coincides with the designated longitude, or orbital slot, of satellite 700, also known as the Nadir (Na) direction, and with the longitudinal axis of satellite 700, also known as the Zenith-Nadir (Ze-Na) direction. In an external reference frame, an axis passing through satellite 700 and parallel to the North-South of Earth is marked as the satellite's N-S axis while the axis passing through satellite 700 and perpendicular to arrow 710 and to the satellite's N-S axis is marked as the satellite's E-W axis, where the East direction points to the east of Earth and the west direction points to the west of Earth. Accordingly, the satellite's E-W axis lies substantially in the plane of orbit 7000.

Geostationary satellites are required to maintain their allocated slot in the geostationary belt (orbit 7000) with a permissible window of deviation $SAT_{WINDOW}$ from the exact location on orbit 7000, as illustrated schematically in FIG. 7B. The permissible window is defined by two N-S boundary lines 7000A, 7000B which are parallel to and defined on each side of orbit 7000 and two E-W boundary lines 7000C, 7000D defined on the west and east ends of $SAT_{WINDOW}$.

The mission of keeping a geostationary satellite within the boundaries of its $SAT_{WINDOW}$, called Station Keeping (or SK), is carried out by the satellite itself, using its on-board facilities and energy resources. Geostationary orbit (GEO) satellites must thrust frequently in various directions throughout their life span in order to stay within their slot/window against the pull of various gravitational and solar pressure forces that alter their nominal position, or station, on the ideal circular orbit. The main Station Keeping (SK) correction required is against north-south (N-S) inclination changes pulling the satellite outside of the equatorial plane. This N-S correction demands velocity corrections that add up to a total of about 50 meters/second (m/s) annually (equivalent to an impact of 50 Newton-seconds during the year per each Kg of satellite body mass).

Another important correction, although about an order of magnitude smaller, is the east or west (E/W) correction. Depending on the satellite's nominal longitude value, the orbital velocity corrections needed for E/W correction are up to 3 m/s annually. Geostationary commercial satellites usually apply SK thrusts using their on-board propulsion system. When they are about to run out of their propellant, the operators must end the ComSat service life and use the remaining on-board propellant to re-orbit the satellite to a 'graveyard' orbit using the specially allocated residual propellant. This is necessary, even though the whole service functionality is intact, otherwise the ComSat will drift from its station, lose its line of communication with its ground station, and eventually interfere or even collide with other spacecraft. Re-orbiting an otherwise fully functional ComSat is an expensive solution to the station keeping need.

According to embodiments of the present invention, station keeping of large satellites having little or no propellant is performed using small and micro-tug or service satellites, with a configuration that includes only two or three electrical thrusters for station keeping. The special features that enable N-S and E/W station keeping maneuvers will now be described in detail.

The conventional way to perform station keeping by the service satellite is to dock to the target satellite by a firm and freedom-less docking system. The tandem assembly can then be maneuvered using the array of multiple thrusters located on various locations on the service satellite. Each combination will yield a thrust in a different primary direction, and fine-tuning of the thrust level in each thruster of that combination will enable fine-tuning of the thrust direction. This is the propulsion array often incorporated in satellites to achieve the control flexibility needed for complete six degree-of-freedom maneuvering.

According to embodiments of the present invention, it is particularly efficient to carry out the station keeping operation aided by the docking and tugging arrangements described above with regard to FIG. 2A to FIG. 6C, inclusive. There are several known methods of applying external thrust to keep a ComSat in its designated slot, most of which involve four to six thrusters. The method described hereafter requires only two thrusters. The following features of the docking and tugging arrangements presented above that may be used for station keeping are:

Circular symmetry of the docking system of the service satellite relative to the Zenith-Nadir (Ze-Na) axis of the serviced satellite. This is achieved simply by docking to the interface ring (IR) of the serviced satellite, which is naturally circular. This can be accomplished by deployment of the co-radial gripping arms. (Symmetrical deployment is not required). In addition, the service satellite can maintain stability in any rotation angle required (yaw angle). According to preferred embodiments of the invention, each of the gripping arms moves independently of the others. Thus, symmetrical deployment of the gripping arms is not required, even during docking. Rather, co-radial or equidistant gripping arms permit docking and re-docking at any relative angular position around the main longitudinal Ze-Na axis between the service- and serviced satellites. This can be accomplished, for example, by releasing slightly the grip of gripping arms on the ring, rotating the service satellite relative to the serviced satellite by means of momentum wheels in its attitude control mechanism, and tightening the grip of the gripping arms in the new location at the selected yaw angle relative to the serviced satellite.

Certain angular degrees of freedom exist between the Ze-Na axis of the serviced satellite and the Ze-Na axis of the service satellite. In the exemplary docking system described above, this may be achieved by setting the length of each of the gripping arms to a desired length so that the interface ring is attached securely such that a small relative angle exists between its axis (which coincides with the Ze-Na axis of the serviced satellite) and the Ze-Na axis of the service satellite. This may also be achieved in several other ways, such as providing angular degrees of freedom by mounting the thrusters on a separate tilting mechanism.

Figure 8:
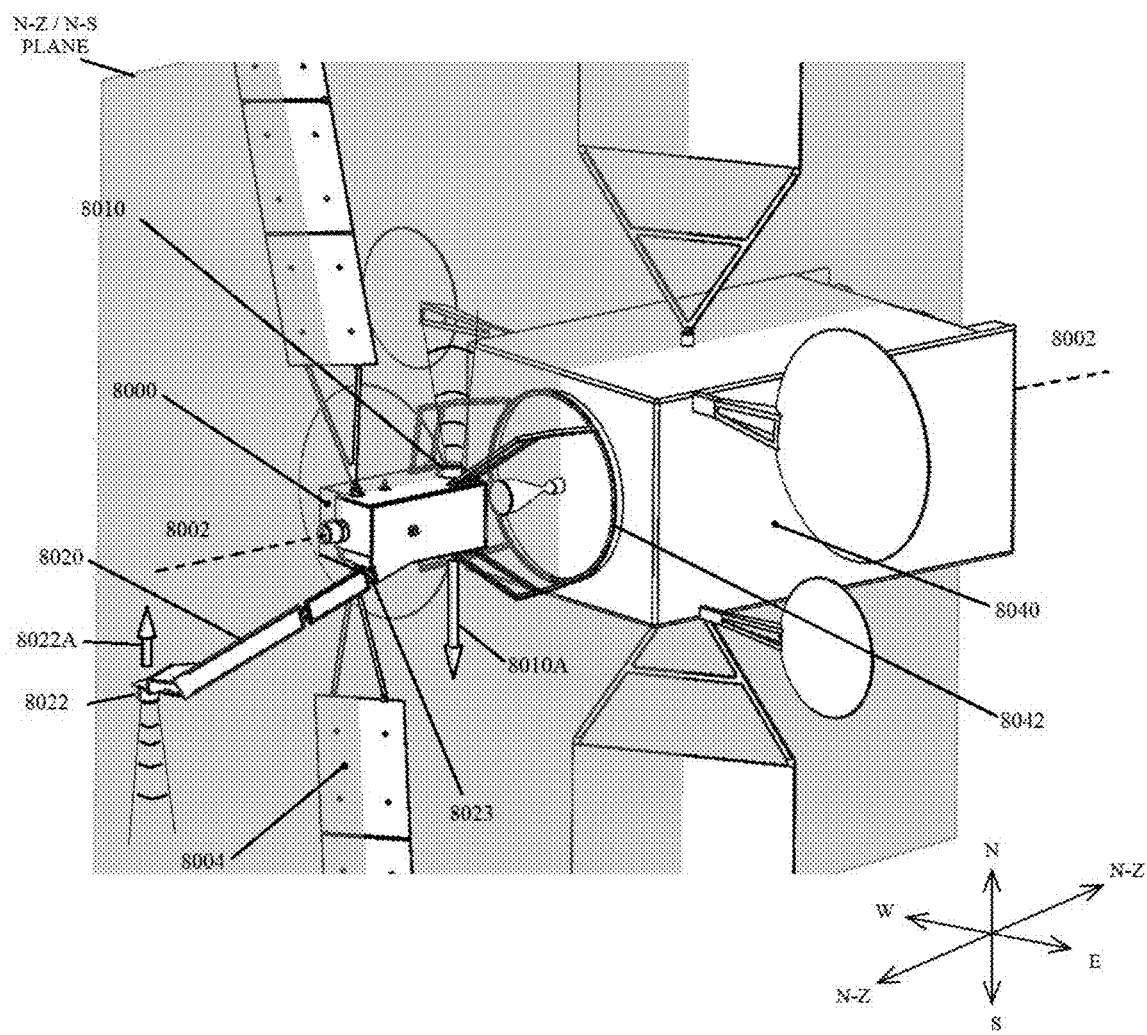
FIG. 8 schematically presents two thrusters operative in a station keeping mission after a service satellite has docked to a serviced satellite, according to embodiments of the present invention.

Reference is made now to FIG. 8, which schematically illustrates thrusters 8010 and 8022 operative in station keeping mode after service satellite 8000 has docked to a serviced satellite 8040, according to embodiments of the present invention. Service satellite 8000 is shown docked to the interface ring 8042 on the zenith face of serviced satellite 8040, so as not to occlude the line of sight of the serviced satellite's antennas with the ground station on earth. In this embodiment, service satellite 8000 is equipped with two station keeping thrusters 8010 and 8022. Thruster 8010 and balance thruster 8022 may be electrical thrusters powered by, for example, electrical energy collected by solar panels 8004 of service satellite 8000. Plane Na-Ze/N-S is indicated in FIG. 8 by a grey plane surrounded by a thin dashed line. Plane Na-Ze/N-S crosses through substantially the middle of serviced satellite 8040 and substantially through the middle of service satellite 8000, so that plane Na-Ze/N-S crosses close to the joint center of gravity (jCoG) of the combination of service satellite 8000 and the serviced satellite 8040, as explained in detail herein below.

Thruster 8010 is located on one of the external faces of the body of service satellite 8000 close to the nadir side of service satellite 8000, so that after docking to a serviced satellite 8040, it is located close to the serviced satellite. Preferably, thruster 8010 is disposed such that its thrust direction 8010A lies within the Na-Ze/N-S plane. Balance thruster 8022 is mounted at the end of a balance thruster boom 8020. Preferably, balance thruster boom 8020 is a deployable boom. The deployment mechanism may include a helical tube that is capable of performing the rotation needed and also can transfer propellant from the propellant tank to the deployed thruster. (See, for example, FIG. 1C.) Balance thruster arm 8020 is installed on the side of service satellite 8000 via a pivotal connection 8023, so that thruster arm 8020 can be stored in a stowed position adjacent the body of the service satellite until station keeping thrust is required. (In the stowed position, the value of $\alpha_{ARM}$, the angle between the body of the satellite and the horizontal axis of balance thruster arm 8020 is zero or close to zero).

When a station keeping operation is to be carried out, balance thruster arm 8020 is deployed and pivots to an open and extended position. In this way, the balance thruster arm is pivoted until angle $\alpha_{ARM}$ reaches its station keeping value. When balance thruster arm 8020 is in its station keeping (i.e. in its extended) position, balance thruster 8022 may be located so that its thrust 8022A lies within the Na-Ze/N-S plane. This arrangement is particularly appropriate for a small/micro satellite which must converge in the stowed mode to the auxiliary payload volume limitations as illustrated, while providing service during the station keeping mode to much larger communication satellites having a mass of up to 15 times more than the service satellite itself. If desired, a motor can be provided to permit thruster boom to open to one of several pre-selected angles.

Figure 9:
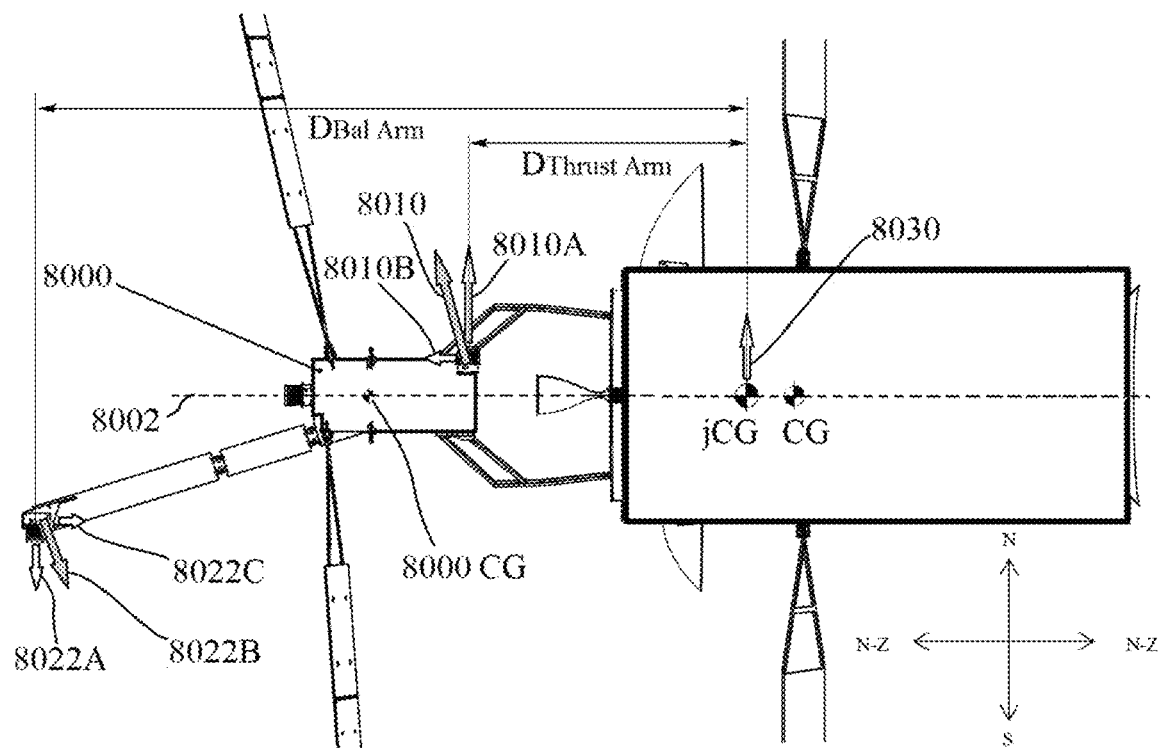
FIG. 9 schematically presents the location and directions of operation of the two thruster of FIG. 8, according to embodiments of the present invention.

Reference is made to FIG. 9, which schematically illustrates the location and directions of operation of thruster 8010 and balance thruster 8022, according to embodiments of the present invention. According to embodiments of the present invention, the mass and volume of service satellite 8000 is, on an average, an order of magnitude smaller than that of the serviced satellite, so the joint center of gravity (jCoG) of the tandem is very close to the center of gravity (CoG) of the serviced satellite alone. Thruster 8010 is located $D_{THRST\_ARM}$ away from jCoG point. Balance thruster 8022 is located $D_{BAL\_ARM}$ away from jCoG to the same direction of $D_{THRST\_ARM}$. As seen in FIG. 9, $D_{BAL\_ARM}$ is longer than $D_{THRST\_ARM}$. Therefore, in order to maintain zero angular moment about jCoG as a center of rotation, the component 8022B of balance thrust 8022A perpendicular to longitudinal line 8002 passing through the jCoG point must be smaller than the component of portion 8010A of thrust

8010 that balances it. Thrust 8010 may be directed, within the plane of the page, slightly off a right angle with respect to longitudinal line 8002. Thrust 8010 may be decomposed into a first component 8010A, perpendicular to line 8002 and directed to South, and a second component 8010B, parallel to line 8002 and directed towards jCoG. Balance thrust 8022A may be decomposed into first component 8022B, perpendicular to line 8002 and directed to North, and a second component 8022C, parallel to line 8002 and directed away from jCoG. The magnitude of 8010B may be equal to that of 8022C and, being in opposite directions, they may cancel each other mutually. The net vector sum of 8010A and 8022A is vector 8030. Since the magnitude of 8022B is set to cancel rotational moment about the jCoG point, the operation of vector 8030 may be presented as acting directly on the jCoG point. In the example of FIG. 9, it acts in the South direction. It will be appreciated that since thrust vectors 8010 and 8022A act within a plane which also includes the jCoG point, the resulting movement of the combination of service satellite 8000 and the serviced satellite 8040 is only to the South, and no rotational movements in the plane of the page or perpendicular to the plane of the page are incurred. It will be appreciated that the arrangement presented above is designed since it is expected that compensation for the angular momentum of the combination of two satellites could not be handled solely by momentum wheels, even large and heavy momentum wheels.

According to embodiments of the present invention, the balancing thrust 8022A should be as small as possible, to leave a maximum net thrust 8030 to perform the station keeping mission. Accordingly, the balance thruster should be as far from serviced satellite 8040 as possible in order to amplify its resulting moment. To allow such a long distance in a micro satellite, such as satellite 8000, arm 8020 holds the balancing thruster on its end, far from the thruster 8010, preferably at least double the distance from jCoG point. The balancing thrust 8022B is therefore about half that of thrust 8010A, resulting in a net N-S thrust of about half that of the main thrust. The balancing thrust may be adjusted by a control system (not shown) relying on, for example, feedback movement/rotational sensors indicating the resulting movements, until the torque about the jCoG point in the plane of the page, in the example of FIG. 9, drops down to zero, or at least to a level that can be handled by attitude control equipment. Preferably, balance thruster arm is deployed already during in-orbit tests prior to docking, so as not to interfere with the docking process.

Whether to apply the daily thrust north-wise or south-wise is a mission-related system decision and depends on the sun's gravitational pull, which is towards the north from March 21 till September 21th, and towards the south during the second half of the year. Furthermore, the timing of activation is always when the satellite is close to one of the orbital nodes, either the ascending node (AN), defined as the south-to-north equatorial crossing, or the descending node (DN), defined as the north-to-south equatorial crossing. This permits a single thruster, which always fires in the same direction, to change inclinations both in the north and south directions. Alternatively, the service satellite can be rotated through a yaw angle of 180° in order to provide the necessary thrust in the flight direction throughout the year.

As presented in FIG. 9 and in the following drawings, it will be assumed that the net required thrust should be directed to the South. The amount of energy and power required for applying daily S/N corrections is rather considerable, especially taking into account that the mass of the serviced satellite 8040 is much larger than that of service satellite 8000. Therefore, using electrical (e.g., ion) thrusters is a useful, effective solution, especially where a relatively large amount of electricity can be directed to the thrusters.

Figure 10:
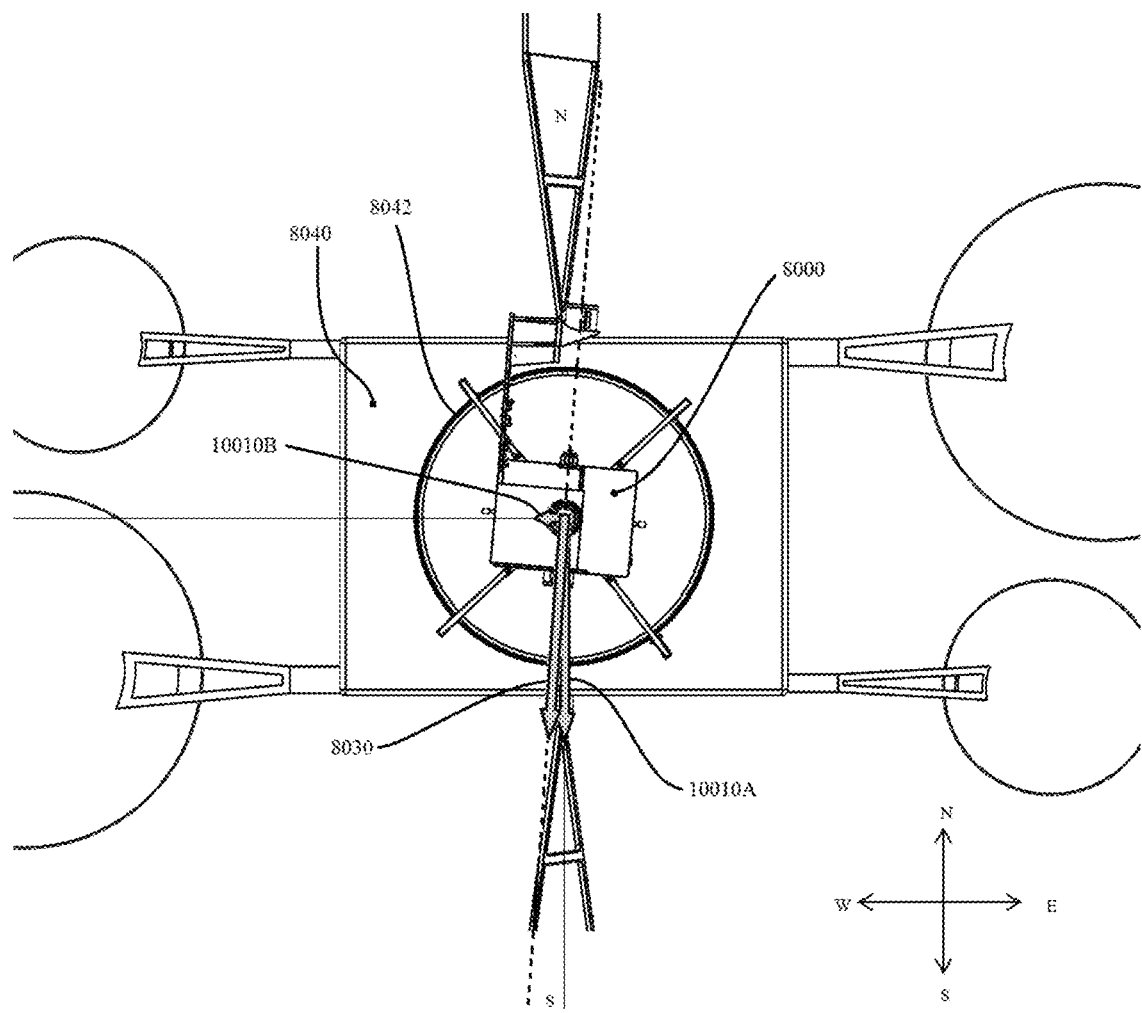
FIG. 10 schematically presents performing of E/W location corrections of a serviced satellite according to embodiments of the present invention.

In order to perform an E/W correction, it is not necessary to provide one or two additional thrusters, as depicted with respect to the N/S location corrections. Since the energy, power and duration required for performing E/W are much smaller, advantage may be taken of the rotational symmetry of the interface ring 8042 of the serviced satellite 8040. Reference is made to FIG. 10, which schematically illustrates performing E/W orbital corrections of a serviced satellite, according to embodiments of the present invention. Service satellite 8000 and the serviced satellite 8040 are viewed in FIG. 10 along their longitudinal axes, shown in their N/S-E/W plane. In the same way as described with regard to FIG. 9, a net vector 8030 may be produced by proper operation and direction of thruster 8010A and balance thruster 8022A, acting in the Na-Ze/N-S plane with zero rotational moment about jCoG point. As seen in FIG. 10, the relative position of service satellite 8000 may be changed with respect to the serviced satellite 8040 so that the plane in which net thrust vector 8030 acts is rotated, in the N-S/E-W plane, slightly away from the N-S plane, by an angle $\gamma_{OFF\_S/N}$. Due to this offset from the S-N plane, thrust vector 8030 may be decomposed into a main component 10010A and an E/W component 10010B. Since $\gamma_{OFF\_S/N}$, is relatively very small, up to 3 degrees, main component 10010A, acting in the South direction in the example of FIG. 10, is much larger than the E-W component 10010B, acting in the E-W directions, as is proper, since typically the E-W corrections are much smaller and less frequent. The exact ratio between the required N-S corrections and the required E-W corrections depends on the specific serviced satellite and the designated longitude slot assigned to it. In order to enable service satellite 8000 to service any serviced satellite in the range, the service satellite must be enabled to set the value of angle $\gamma_{OFF\_S/N}$ to any desired value. This may easily be done by gentle corrections of the relative rotational position of service satellite 8000 with respect to the serviced satellite 8040 using, for example, momentum wheels, as is known in the art, in order to control the rotational angle of service satellite 8000 prior to docking onto the serviced satellite, or during serving its station keeping mission, as may be needed.

The re-orbiting phase will now be described, for moving a spent satellite from GEO to a graveyard orbit. This stage uses all parameters that were gathered during the post docking measurements performed in the station keeping stage. This will ensure precise operation of the thrusters. The service satellite will move the serviced satellite to graveyard orbit (230 to 300 km above the GEO belt). This maneuver will be done mainly using the Zenith electric thruster 101. In general terms, the method includes changing a thrusting direction of the docked service satellite and serviced satellite, then firing a thruster to create a thrusting vector to propel the docked service satellite and serviced satellite in the changed direction of flight. Alignment of the thrusters is adjusted so that a thrusting vector passes through the joint center of gravity of the service satellite and the serviced satellite. When the docked service satellite and serviced satellite reach a desired orbital slot, the service satellite un-docks from the serviced satellite and can be directed to the next serviced satellite. More specifically, the re-orbiting phase will start with a pitch maneuver eastwards to a GTO orientation that will be performed by the serviced satellite's attitude control system. Afterwards, the service satellite will initiate a full throttle maneuver using its zenith electrical thruster. At the end of this stage both satellites will reach graveyard at a pre-chosen longitude. Minor adjustments can be made to maintain the serviced satellite in the desired orbit. While both satellites are located at the graveyard orbit, the service satellite will slowly open its gripping arms, first to loosen the tightening, and later, when the serviced satellite is stable, the arms will fully open to completely separate from the serviced satellite. After the separation, the service satellite will return to a vacant slot in the GEO belt, to wait there for the next service mission.

The de-orbiting will now be described, for removing a serviced satellite from LEO by pushing it down into the atmosphere to burn or fall to Earth. Parameters gathered during prior maneuvers of the serviced satellite by the service satellite help to plan and ensure the precise de-orbiting maneuver to avoid any safety issues related to atmosphere re-entry. In general, the method involves changing a thrusting direction of the docked service satellite and serviced satellite and firing a thruster to create a thrusting vector to propel the docked service satellite and serviced satellite in the changed direction. Alignment of the thrusters is adjusted so that a thrusting vector passes through a joint center of gravity of the service satellite and the serviced satellite. When the docked service satellite and serviced satellite reach a desired longitude, the thrusters of the service satellite are fired to slow down the docked satellites. When they reach a fall trajectory, the service satellite un-docks from the serviced satellite and returns to a selected orbit. More specifically, first, the service satellite will push the serviced satellite as necessary according to the planned de-orbiting location to bring it into the right inclination, and then wait to reach the right longitude. As it approaches the planned location for de-orbiting, the tandem will change its attitude, either using the propulsion system of the service satellite or by the momentum wheels of the serviced satellite, so the main pushing thruster of the service satellite is directed in the trajectory course. At the planned time, the service satellite will actuate a suitable braking thrust and, right afterwards, will separate from the serviced satellite. The serviced satellite will de-orbit as planned, while the service satellite can shift back its attitude and thrust again to return to service orbit for the next mission.

When the structure and loading of the serviced satellite places its CoG out of the thrust plane drawn when the service satellite is aligned with the serviced satellite (i.e., when their longitudinal axes coincide), exertion of thrust may cause undesired angular movement of the serviced satellite. Angular movements may also be caused by misalignment of thrusters, or misalignments of thrust vectors due to thruster wear out. In order to overcome these undesired rotational movements or torques without overuse momentum balance by, e.g., reaction wheels or counter-thrusts, the extension of each of the gripping arms, such as arms 404 of FIGS. 4A to 4E, may be set so that the service satellite gains a certain angular posture relative to the serviced satellite. Thus, the thrust plane will pass through the actual jCoG of the combination of the service satellite and the serviced satellite, as is explained with respect to FIGS. 6A-6C.

It will be appreciated that changing the thrust direction can be implemented by actuating momentum wheels of the serviced satellite. Alternatively changing the thrust direction can be implemented by means of the secondary propulsion system, i.e., a plurality of thrusters disposed about the service satellite body.

While the invention has been described hereinabove with regard to docking onto the interface ring of a serviced satellite, it will be appreciated that, alternatively, the service satellite can dock to another selected target element which is part of the serviced satellite, with appropriate structural adjustments.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A service satellite for providing in-orbit services to an orbiting satellite, the service satellite comprising:
    a body;
    at least two thrusters;
    at least two docking arms connected to the body and configured to engage with an interface ring extending from an external surface of the orbiting satellite, each of the at least two docking arms including:
        a ring-engaging end configured to couple with the interface ring; and
        a four-bar linkage assembly, including:
            a first crank pivotably connected to the service satellite;
            a second crank pivotably connected to the service satellite and spaced apart from the first crank; and
            an operational arm pivotably connected at a first location to the first crank and pivotably connected at a second location to the second crank; and
    at least one controller configured to:
        move each of the at least two docking arms to enable the ring-engaging end of each of the at least two docking arms to couple with the interface ring at at least two spaced-apart locations on the interface ring, thereby forming an interconnection between the service satellite and the orbiting satellite through the externally extending interface ring, and thereby permitting the service satellite to join with the orbiting satellite, forming a tandem assembly; and
        coordinate firing of the at least two thrusters to enable thruster firing on the service satellite to propel the orbiting satellite through forces exerted through the externally extending interface ring.

2. The service satellite of claim 1, wherein the at least two docking arms are adjustable and wherein the at least one controller is configured to adjust the at least two docking arms to thereby cause a tilt between the service satellite and the orbiting satellite.

3. The service satellite of claim 2, wherein the at least one controller is configured to cause an angle of tilt of up to about 4° between the service satellite and the orbiting satellite.

4. The service satellite of claim 2, wherein the at least one controller is configured to initiate the thruster firing to propel the orbiting satellite while the body of the service satellite is tilted relative to the orbiting satellite.

5. The service satellite of claim 1, wherein the interconnection is non-intrusive into the orbiting satellite.

6. The service satellite of claim 1, wherein at least one ring-engaging end includes a recess configured to receive the interface ring of the orbiting satellite.

7. The service satellite of claim 6, wherein the at least one ring-engaging end includes a portion that is rotatable within the recess of the interface ring.

8. The service satellite of claim 6, wherein at least a portion of the ring-engaging end is urged by a spring against the interface ring.

9. The service satellite of claim 1, wherein the at least one controller is further configured to adjust a distance between the at least two docking arms to cause the at least two docking arms to cooperate to grasp the interface ring of the orbiting satellite.

10. The service satellite of claim 1, of between 150 kg and 500 kg and configured to fit within an auxiliary payload space of a launch vehicle.

11. The service satellite of claim 1, wherein the operational arm is pivotably connected to the first crank at the first location on a first side of the operational arm proximate the body, and the operational arm is pivotally connected to the second crank at a location between the first location and the ring-engaging end.

12. The service satellite of claim 1, further including at least one solar panel attached to and extendable from the body in an orientation that is tilted at an angle of over about 30 degrees with respect to a north-south axis of the body.

13. The service satellite of claim 12, wherein the at least one solar panel includes a first solar panel rotatable about a longitudinal axis thereof, and wherein the at least one controller is configured to rotate the first solar panel to avoid casting a shadow of the first solar panel on a second solar panel attached to the orbiting satellite.

14. The service satellite of claim 1, wherein after coordinating firing of the at least two thrusters to propel the orbiting satellite, the at least one controller is further configured to:
- move the at least two docking arms to disengage the ring-engaging end of each of the at least two docking arms from the interface ring of the orbiting satellite;
- fire the at least two thrusters to move the service satellite away from the orbiting satellite and to position the service satellite within docking distance of another orbiting satellite; and
- move each of the at least two docking arms to enable the ring-engaging end of each of the at least two docking arms to couple with an interface ring of the another orbiting satellite, thereby forming another interconnection between the service satellite and the another orbiting satellite through the externally extending interface ring of the another orbiting satellite, and thereby permitting the service satellite to join with the another orbiting satellite, forming another tandem assembly; and
- coordinate firing of the at least two thrusters to propel the another orbiting satellite through forces exerted through the externally extending interface ring of the another orbiting satellite.

* * * * *